(12) United States Patent
Holcomb

(10) Patent No.: US 7,015,254 B2
(45) Date of Patent: Mar. 21, 2006

(54) DESCRIPTION OF AN INORGANIC POLYMER "ELECTRET" IN A COLLOIDAL STATE ALONG WITH THE METHOD OF GENERATING AND APPLICATIONS

(76) Inventor: Robert R. Holcomb, 1500 21st Ave. S., Nashville, TN (US) 37212

(*) Notice: Subject to any disclaimer, the term of this patent is extended or adjusted under 35 U.S.C. 154(b) by 514 days.

(21) Appl. No.: 09/749,243

(22) Filed: Dec. 26, 2000

(65) Prior Publication Data

US 2001/0027219 A1   Oct. 4, 2001

Related U.S. Application Data

(63) Continuation-in-part of application No. 09/092,676, filed on Jun. 5, 1998, now abandoned.

(60) Provisional application No. 60/085,289, filed on May 13, 1998, provisional application No. 60/069,065, filed on Dec. 10, 1997, provisional application No. 60/067,717, filed on Dec. 8, 1997, provisional application No. 60/048,766, filed on Jun. 5, 1997.

(51) Int. Cl.
    *C01B 33/143* (2006.01)
(52) U.S. Cl. .................. 516/82; 516/83; 516/100; 252/179; 252/184; 307/400; 264/436
(58) Field of Classification Search ................ 252/179, 252/184; 264/436; 307/400; 510/253; 423/338; 516/111, 100, 83, 82; 365/146; 210/687
See application file for complete search history.

(56) References Cited

U.S. PATENT DOCUMENTS

| | | | |
|---|---|---|---|
| 2,484,284 A | 10/1949 | Glassbrook et al | |
| 2,765,242 A * | 10/1956 | Alexander et al. | 423/338 X |
| 2,843,138 A * | 7/1958 | Gilman | 137/93 |
| 2,856,268 A * | 10/1958 | Young | 423/338 |
| 3,586,743 A | 6/1971 | Van Eeck | 264/0.5 |
| 3,607,777 A * | 9/1971 | Winall et al. | 423/338 |
| 4,888,113 A | 12/1989 | Holcomb | 210/222 |
| 4,915,870 A | 4/1990 | Jones | |
| 5,229,096 A * | 7/1993 | Cohen | 423/338 |
| 5,537,363 A | 7/1996 | Holcomb | 366/136 |
| 5,565,717 A | 10/1996 | Lewiner et al. | 307/400 |
| 2004/0154220 A1 * | 8/2004 | Holcomb | 044/620 |
| 2004/0166246 A1 * | 8/2004 | Holcomb | 427/440 |

* cited by examiner

*Primary Examiner*—Daniel S. Metzmaier
(74) *Attorney, Agent, or Firm*—Garvey, Smith, Nehrbass & North, L.L.C.; Gregory C. Smith

(57) ABSTRACT

The present invention includes an apparatus for generating an inorganic polymer electret in a colloidal state, the inorganic electret in a colloidal state itself, and applications for the inorganic electret in a colloidal state. The invention includes a method for generation of a colloidal silica particle which is dipolar in that it is positively charged in the nucleus and negatively charged on the outer surface leaving a net negative charge to the particle. The apparatus includes the ability to control particle size, uniformity, consistency, hydration, and three dimensional structure which is desirable for various applications.

9 Claims, 24 Drawing Sheets

160     *Colloid Chemistry of Silica and Silicates*

Electron micrographs showing stages of aggregation of 35 millimicron silica particles: *left*, colloidal aggregates; *center*, aggregates approaching colloidal size; *right*, supercolloidal aggregates or precipitate.

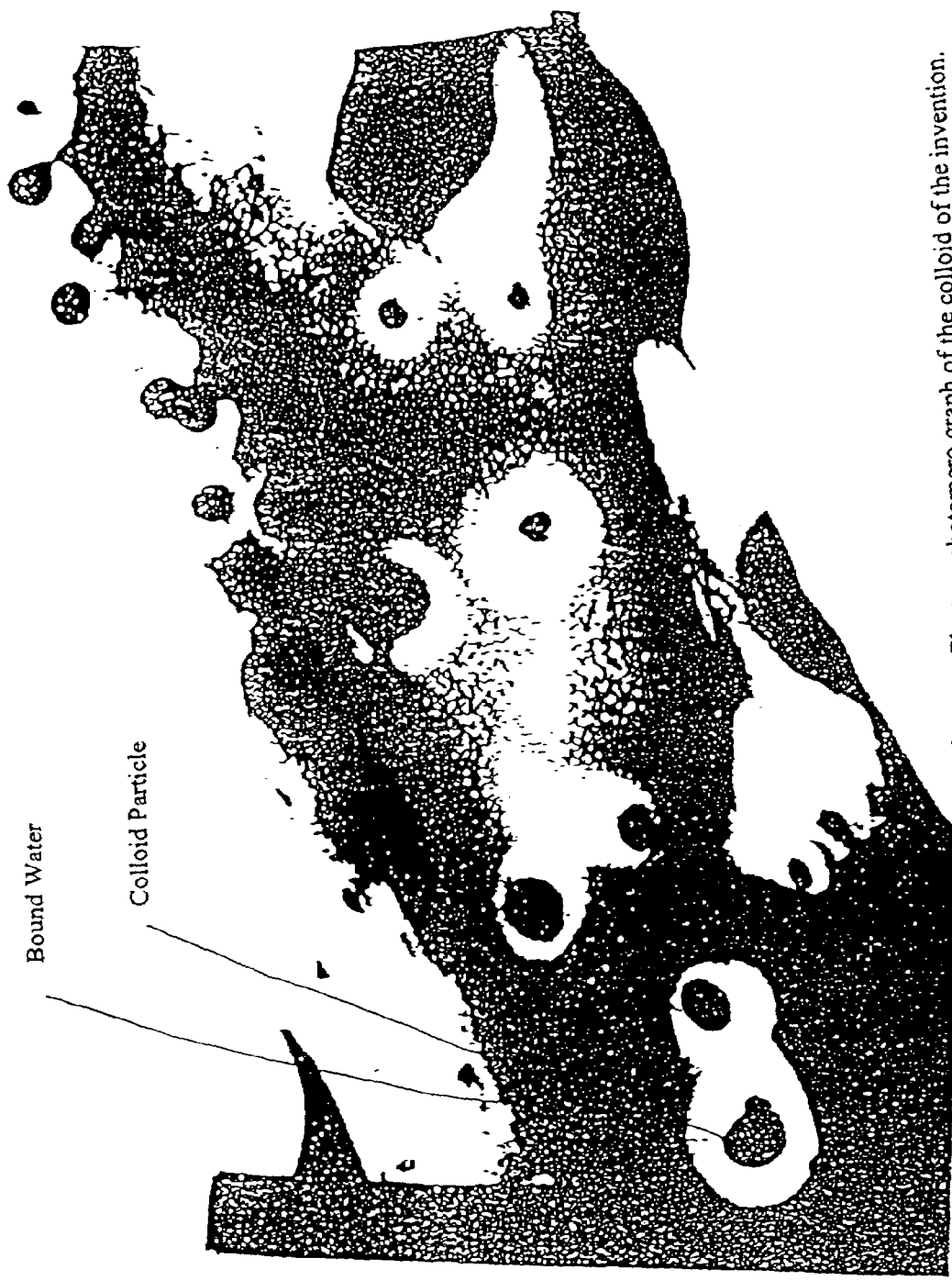
Fig. 6A. Electron photomero graph of the colloid of the invention.

Cross sectional view of counter current generator of the invention with lines A–A' and B–B' noted for measurement purposes.

DESCRIPTION OF AN INORGANIC POLYMER "ELECTRET" IN A COLLOIDAL STATE ALONG WITH THE METHOD OF GENERATING AND APPLICATIONS

CROSS-REFERENCE TO RELATED APPLICATIONS

A continuation-in-part of Ser. No. 09/092,676, filed Jun. 5, 1998, and entitled "Description of an Inorganic Polymer 'Electret' in a Colloidal State Along With the Method of Generating and Applications" now abandoned, which claimed priority from the following provisional applications:

Ser. No. 60/085,289, filed May 13, 1998, and entitled "Gabapentin Monohydrate Converted to a Polyhydrate and Colloidal Silicate and a Process for Producing Same Along With Applications of Same;

Ser. No. 60/069,065, filed Dec. 10, 1997;

Ser. No. 60/067,717, filed Dec. 8, 1997; and

Ser. No. 60/048,766, filed Jun. 5, 1997 and entitled "Description of an Inorganic Polymer 'Electret' in a Colloidal State Along With the Method of Generating and Applications".

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field

The present invention relates to an Inorganic Polymer Electret in a colloidal state along with a unique method of synthesis which reveals the inorganic and physical chemistry model for the growth of the particle along with methods of use in its various states and embodiments, liquid, solid, and gel.

One such method for use is the use for reactivating or regenerating ion exchange resin beds by backwashing with a solution of Inorganic Polymer "Electret."

Inclusions: Included with this submission is the core patent for this material "Description of an Inorganic Polymer "Electret" in a Colloidal State along with the Method of Generating and Applications." This provisional application is made a part of this current submission by inclusion and reference.

Another method of use is the method of use for reverse osmosis units in which the IPE charges the membrane with the calcium and magnesium sequestering IPE. This layer of colloid protects the membrane from scaling and makes it much more efficient and gives the membrane longer life. The membrane is protected through a mechanism of charge repulsion by the colloid. The colloid sequesters the calcium, the colloid has a strong net negative charge which keeps the sequestered calcium in the reject stream.

Inclusions: Included with this submission is the core patent for this material "Description of an Inorganic Polymer "Electret" in a Colloidal State along with the Method of Generating and Applications." Description of an Inorganic Polymer "Electret" in a Colloidal State and its Use in Conjunction with Ion Exchange Softening Technology and Nitrate Removal as well as supporting data for all applications cited. The applications and materials are made a part of this current submission by inclusion and reference.

2. State of the Art

Methods of generating an unstable silica colloidal suspension, such as activated silica when sodium silicate is activated with sulfuric acid, aluminum sulfate, carbon dioxide, or chlorine and a relatively stable aqueous suspension of colloidal silica (U.S. Pat. No. 5,537,363) have been described. None of these methods discuss the molecular and physical parameters of the particle as they are effected by the method of generation of the particle, nor how the chemical and physical properties relate to the applications.

The present invention presents a method heretofore not described for the generation of a colloidal silica particle which is dipolar in that it is positively charged in the nucleus and negatively charged on the outer surface which gives a net negative charge to the particle. Another important aspect of this invention is the ability to control the particle size, charge, uniformity, consistency, hydration and three dimensional structure. It is desirable to be able to control these parameters such that the particle can be used in a reproducible fashion for a vast variety of applications in which it is desirable to manipulate the distribution of surface charges for commercial benefit.

I have discovered a method for generating a uniform, consistent aqueous composition containing inorganic colloidal silica in the form of an inorganic polymer, which is configured in a desirable fashion by the addition of potassium to the generating fluid which aids in the configuration of the particle.

The active component of the invention comprises an aqueous suspension of a colloidal silica in which the three dimensional charged structure is generated by a special method of generating an electrostatic field which charges the particle, as it is synthesized, with an electrostatic charge. The solution is preferably mixed in such a way that the colloidal particles become electrically charged by circulating the charged solution through a counter current flow apparatus at a controlled velocity and at a controlled rate of adjustment of the pH of the solution. As the pH is lowered, the particle (polymer) grows as it is charged. Multiple layers of charged fluid are traveling in a counter current chamber such that each layer generates a magnetic flux field and thereby generates an electrostatic charge on the adjoining layer of fluid. The rate of generation is enhanced by the use of an apparatus such as in U.S. Pat. No. 4,888,113, when such apparatus is placed on the counter current chamber. The current invention is a significant improvement in design which brings about functional differences as a result of the design differences from those of the existing art in U.S. Pat. No. 4,888,113. The new embodiment establishes a symmetric three dimensional field gradient. This embodiment requires round center charged magnets. The device comprises a plurality of center charged, static magnetic bodies in each device, having at least two positive and two negative magnetic poles substantially in two parallel planes, the magnetic poles being oriented to define the four vertices of a quadrilateral shape, the two positive poles defining opposite diagonal vertices, and the two negative poles defining opposite diagonal vertices of the quadrilateral shape, each of the magnetic poles being magnetically attracted by the oppositely charged poles and being magnetically repelled by the like charged poles. Two of the oppositely charged poles on each end of the device are facing and have surfaces which are parallel. This array generates a magnetic void at the intersection of a line drawn between the opposite diagonal vertices of the invention. This null point is essential to generate a steep symmetrical three dimensional field gradient in the interior of the generator conduits.

There is a need for a colloidal generator which will generate a colloidal particle which is consistently uniform in size, shape and charge, thereby allowing one to tailor make the product for specific applications.

Accordingly, it is an object of this invention to provide a device which may be computer controlled to regulate the pressure, flow and rate of titration of acid medium and therefore enables one to design and build some specificity into the process of generating the net negatively charged particle.

Another object of the invention is to prepare a counter current colloid generator in which the device is constructed of multiple thin wall pipes, one inside the other, with conduit means at each end to allow the fluid to flow in the opposite direction and one layer up as it comes to the end of each conduit.

It is a further object of this invention to prepare a counter current colloid generator made of thin wall stainless steel or plastic. This thin wall will allow the magnetic field generated by each layer of fluid to generate an electrostatic charge on the adjacent counter current fluid column.

Another object of this invention is to demonstrate a detailed method of making one such colloidal particle of silica in a new and unique method of generating an electrostatic charge which is generated by flow of an adjacent fluid column containing charged particles which generate magnetic flow.

Another object of this invention is to demonstrate the many uses of this and other organic and inorganic colloids which can be generated by this method.

Another object of this invention is to provide a high pressure, high speed pump, to pump the fluid through the counter current generator of the invention at a high velocity.

It is a further object of this invention to present a generator which will build a silica colloid in which the stability is dependent on internal $K^+$ bonding. Historically, citrate ion has been credited with introducing stability to such colloidal solutions. It is further demonstrated that tripotassium citrate works as a stabilizer of the colloid of the invention and that sodium citrate on an equal molar basis does not work in the system of tis invention. It will also be noted that potassium chloride serves as a stabilizer of the colloid in this invention. This data, along with electron beam diffraction studies, reveal that $K^+$ is an important component to the full development of the particle in a useable, stable state.

It is further the object of this invention to build a silica colloid of high concentration such that the material will, when heated at a particular temperature for a specific period of time, form a very porous silica/silica colloid which functions remarkably well as a water filtration media bed for the purpose of softening water, applying a net negative charge to water appliances including pipe lines for the removal of scale consisting of iron, calcium carbonate, calcium sulfate and other mineral deposits. The material may be crushed and sized for use in varying hardness of water. The smaller particles (i.e. more surface area per gram) will be used for harder water. The silica crystallizes to form a matrix and the colloid leaches out of the matrix to soften and descale. The media absorbs $Fe^{++}$, $Fe^{+++}$, and $Ca^{++}$ to its net negatively charged surface, thereby removing these substances from contaminated (i.e. hard) water. The suspended colloid in low concentrations will sequester ions such as $Ca^{++}$, $Fe^{++}$, $Fe^{+++}$, $Mg^{++}$ and render them inactive as hardness factors in water. The same sequestration occurs with odor and bad taste contaminants of water.

Cation Exchange Softening

Introduction: One very popular method of softening water for residential use is cation exchange.

Mechanism: The hardness-producing elements of calcium and magnesium are removed and replaced with sodium by a cation resin. Ion exchange reactions for softening may be written where R represents the active site on the resin:

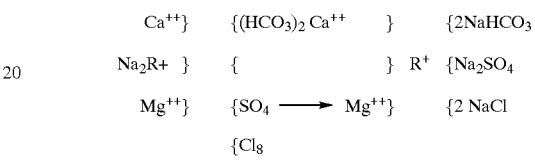

They show that if water containing calcium and magnesium is passed through an ion exchanger, these metals are taken up by the resin, which simultaneously gives up sodium in exchange.

After the ability of the bed to produce soft water has been exhausted, the unit is removed from service and backwashed with a solution of sodium chloride. This removes the calcium and magnesium in the form of their soluble chlorides and at the same time restores the resin to its original active sodium condition:

Reaction

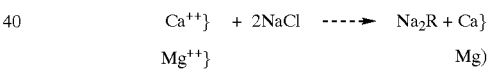

The majority of ion exchange softeners are the pressure type, with either manual or automatic controls. They normally operate at rates of 6 to 8 gpm/ft² of surface area. About 8.5 lb. of salt is required to regenerate 1 ft³ of resin and removes approximately 4 lb. of hardness in a commercial unit. The reduction in hardness is directly related to the amount of cations present in the raw water and the amount of salt used to regenerate the resin bed.

Anion Exchange for Nitrate Removal

Being chemically unreactive, the nitrate ion cannot be precipitated and filtered from water by conventional treatment processes Ion exchange is the most effective method for reducing nitrate nitrogen to the maximum containment level of 10 mg/l for drinking water. The most commonly used and apparently the best system appears to be a strongly basic anion exchanger, which uses sodium chloride as a regenerant. All anion exchange resins preferentially remove divalent anions, therefore both sulfate and nitrate ions are extracted and replaced by chloride ions. When the capacity for exchanging nitrate ions is depleted, a regenerating solution with a high salt content is pumped through the bed to displace the nitrate and sulfate ion and thereby rejuvenate or regenerate the exchanger.

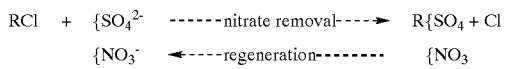

The volume of waste backwash brine is significant, amounting to about 5% of the water processed.

The major disadvantages of anion exchange treatment are high operating costs and the problem of brine disposal.

The present invention presents a method for the generation of a colloidal silica particle which is dipolar in that it is net positively charged in the nucleus and net negatively charged on the outer surface which give a net negative charge to the particle.

It is a further object of this invention to present a concentrated form of the IPE in the embodiment converted to a solid crystalloid matrix which releases active colloid as water flows over a fine mesh containment means in which the Inorganic Polymer Crystalloid (IPC) is placed. The IPC doesn't solubalize in the containment means. The soluble form in the flowing water adjacent to the fine mesh containment means is in equilibrium with a hydrated gel which is adhered to the mesh screen forming a metering membrane. This gel form is in equilibrium with the solid colloid of the crystalloid. When water flow begins, the silica colloid is metered off the hydrated layer of the mesh screen.

It is a further object of this invention to demonstrate the use of this IPC utilized in a fine mesh embodiment to be placed in the "Salt Tank" of ion exchange resin units to be used instead of sodium chloride or potassium permanganate to reactivate ion exchange media beds. The IPC is placed in the salt tank in one of a variety of fine mesh containment means to backwash the resin with silica colloid from the IPC reservoir. If a mixed media bed (i.e. cationic and anionic) is employed, it will remove $Ca^{++}$, $Mg^{++}$, $SO_4^{2-}$, $NO_3^-$, $Fe^{++}$ and $Mn_2^+$.

It is a further object of this invention to present the ion exchange embodiment and the method of applying the IPC to the backwash system.

It is a further object of this invention to reveal the use of the present invention in the enhancement of reverse osmosis.

Reverse Osmosis

Reverse Osmosis is the forced passage of water through a membrane against the natural osmotic pressure to accomplish a separation of water from a solution of dissolved salts. The process of osmosis involves a thin membrane which separates waters with different salt concentration. The membrane is permeable to water but not the salts and other solutes in the water. Therefore, water flows in the direction of the highest concentration of salt. If pressure is applied to the side of higher salt concentration, the flow of water can be prevented at pressure termed the "osmotic pressure" of the salt solution. In reverse osmosis, the water is forced by high pressure from a salt solution through the membrane into fresh water, separating desalted water from the saline solution. The rate of flow through a reverse osmosis membrane is directly proportional to the difference between the applied and osmotic pressures. Operating pressures vary between 250 and 1500 psi. The quantity of product water is 60% to 90% for a feed of brackish ground water and about 30% for a feed of sea water.

Saline water being treated by reverse osmosis must be clear and free of excessive hardness, iron, manganese and organic matter or the membranes will foul. Currently, full and cost effective use of reverse osmosis for industrial and home use as well as municipal is limited by expensive pretreatment (FIG. 4). This pretreatment may consist of coagulation and filtration to remove turbidity, suspended matter, iron and manganese; softening to remove hardness, reducing the potential of calcium carbonate and calcium sulfate precipitate; and possibly filtration through granular activated carbon to remove dissolved organic chemicals. Acid is commonly used to lower the pH and prevent chemical scaling from calcium, magnesium, manganese, iron and other trace mineral compounds. Chlorine may be applied as a disinfectant to control biological growths on the membrane. All of these water contaminants except the organic compounds are harmful to the membrane. Calcium, magnesium and iron are the most harmful. The current method of attempting to handle this problem is very expensive pretreatment with salt regenerated cation exchange resins or by reducing the pH from 8 to 6.4. This is expensive but reduces the bicarbonate alkalinity by reducing the bicarbonate to carbon dioxide to avoid calcium carbonate scale and the adverse effects of iron and manganese. Hexametaphosphate is a sequestering agent to inhibit scale formation. It, however, is toxic and very expensive.

There clearly is a need for a method to inexpensively protect the reverse osmosis membranes so the significant pretreatment isn't necessary, thereby making reverse osmosis a significant part of a universal water treatment system.

The present invention presents a method heretofore described in two sister provisional patents for the generation of a colloidal silica particle which is dipolar in that it is net positively charged in the nucleus and net negatively charged on the outer surface which gives a net negative charge to the particle.

It is a further object of this invention to present an embodiment of this "Inorganic Polymer Electrit" (IPE) which may be concentrated and metered into the inflow stream of the feed water supply of reverse osmosis units in which the feed water stream has not been exposed to significant pretreatment.

It is a further object of this invention to explain and demonstrate the mechanism of the protection of the membranes against fouling and scaling thereby make reverse osmosis a universal water treatment technology.

It is a further object of this invention to present the membrane protection embodiment and the method of applying it to standard reverse osmosis membrane units.

It is a further object of this invention to present a design and method of using this technology to construct and operate a home total water treatment package for producing totally pure water for whole house consumption.

It is a further object of this invention to reveal a list of the applications of this product along with a summary of the divisionals which will follow.

Additional objects and advantages of the present invention will either be set forth in the description that follows, will be obvious from the descriptions, or may be learned by practice of the invention. The object and advantages of the invention may be obtained by the apparatus and method particularly pointed out in the appended claims.

SUMMARY OF THE INVENTION

In accordance with the principles of the present invention as embodied and as broadly described herein, a method of generating and applications for a variety of inorganic polymer electrets in a colloidal state and with particular reference to a method and apparatus for generating a very concentrated silica colloid which is converted into a crystalloid which has extensive applications particularly in the treatment of water for human use and consumption. The silica colloids may also be generated in a more dilute concentration and smaller particle size for different applications. The active device, which contains a series of quadrapolar, steep, three dimensional field gradients, which is effective in the generation of a colloidal silica particle which is dipolar in that it is positively charged in the nucleus and negatively charged on the outer surface which gives a net negative charge to the particles. Another important aspect of this invention is the ability to control the particle size, charge, uniformity, consistency, hydration, and three dimensional structure. The inorganic colloidal polymer is configured by the addition of potassium to the generating fluid, which aids in the configuration of the particle. The particle is a three dimensional charged surface. This charge is generated by a special method of generating an electrostatic field current which charges the colloid as it is synthesized. The solution is mixed in such a way that the colloidal particles become electrostatically charged by circulating the charged solution through a counter current apparatus at a controlled velocity and a controlled rate of adjustment of solution pH. As the pH is lowered, the particle(polymer) grows as it is charged. Multiple layers of fluid are traveling in a counter current chamber such that each layer generates an electrostatic charge on the adjoining layer of fluid. The rate of generation is enhanced by the use of an improvement upon an apparatus such as in U.S. Pat. No. 4,888,113 when such apparatus is placed on the counter current chamber. The device is constructed of multiple thin wall pipes, one inside the other, with conduit means at each end to allow the fluid to flow in the opposite direction by flowing through the conduit means into the next chamber toward the outer pipe (i.e. the chamber formed between concentric pipes). The generator is made of, but not limited to, thin wall stainless steel or plastic. This thin wall will allow the magnetic field generated by each layer of fluid to generate an electrostatic charge on the adjacent counter current fluid column as the silica(semiconductor) colloid in adjacent chambers flows in the opposite direction. This generator of the invention may be used to generate many different organic and inorganic colloids of both net negative and/or net positive charge. The current application of the invention as described herein is for synthesis and curing of a silica colloid which is converted to a crystalloid which has extensive applications particularly in the treatment of water for human and animal use and consumption. The generator of the invention is used to synthesize a solution of 500 ppm to 350,000 ppm (but not limited to) silica colloid in which the stability is dependent upon, among other factors, internal K+ bonding. Holcomb described a method of making a more dilute colloidal silica in U.S. Pat. No. 5,537,363. That patent describes a method using an electromagnetic generator to synthesize a solution of less than 500 ppm and dominant particle size of 0.6 microns. The current method allows the synthesis of concentrations greater than 300,000 ppm in the form of a thick soluble gel network. The concentrate of the current invention may be further processed and dried into an active solid or it may be rediluted to any desired concentration. U.S. Pat. No. 5,537,363 did not reveal this ability. The former patent taught the use of a strong acid, HCl, to adjust the pH during synthesis. The present invention presents evidence that the product of the current invention reveals that only a weak, slowly dissociated acid is effective (See FIG. 12). Another important factor in synthesis is the use of a weak acid (acetic acid) to generate the desired product of the invention. This high concentration material is "gel like" in consistency. Prior to further processing, 20% by volume of 500 to 750 ppm material of small particle size may be added to form a more dense final material. The material may then be degassed by use of a vacuum. The material is then heated up to 150° to 200° F. for up to 144 hours. This process produces a product of varying but controllable density and porosity which functions in a remarkable fashion for water filtration and softening. It imparts a net negative charge to water appliance's scale, including scale on pipelines, for the removal of scale of iron, calcium carbonate, calcium sulfate, and other scale forming chemicals. The net negative charge on the scale allows it to be repelled off the surfaces. The solution is dehydrated and forms a crystalline like matrix and the colloid then leaches out to soften and descale when the material in the solid form is placed into a variety of filter containment means. The media bed will also absorb or sequester $Fe^{++}$, $Fe^{+++}$ and $Ca^{++}$ to its negatively charged surface and inactivates(sequesters) these substances which are found in hard water. The colloid which leaches out of the matrix also sequesters cations in solution and inactivates them.

In accordance with the principles of the present invention as embodied and as broadly described herein, a method and apparatus for generating a very concentrated silica colloid which is converted into a crystalloid which has extensive application in the treatment of water. One such application is described in the method and use of the IPC/IPE polymer to backwash and reactivate and regenerate both anionic and cationic ion exchange resin beds both for home, commercial and industrial applications.

In accordance with the principles of the present invention as embodied and as broadly described herein, a method and apparatus for generating a very concentrated silica colloid which is converted into a dissolvable gel which when fed into the feed water line of a reverse osmosis unit interacts with the calcium magnesium, manganese and iron as well as the reverse osmosis membrane, protecting the membrane and repelling the positively charged cations which cause fouling and scaling of the reverse osmosis membranes.

The following is a list of the applications of this colloidal material in various concentrations and forms which will each be a subject of a divisional patent application:

1. Food quality, food flavor, food texture, food moisture.
2. Fragrance enhancement and duration.
3. Personal care products: a) Cosmetics, b) Soaps, C) Oral care products, tooth deplaquing, toothpaste, mouth rinse.
4. Bath products such as shampoo and conditioner.
5. Brewed beverages.
6. Homecare: a) Detergents, b) Spot cleaners, c) Silver, chrome, and stainless steel cleaners, d) Carpet cleaner, e) Bathroom Cleaners, t) Kitchen cleaners, g) Miscellaneous cleaners for the home, garage, car, boat, shop, and garden.
7. Particle mining and transport: a) Coal, b) Ore, c) Oil.
8. Crude oil—Improve water flood for improved yield.
9. Water treatment, conditioning, and sequestering agent—residential, commercial, industrial, and municipal—for potable, recreational, and waste water as well as for remediation of ground and surface waters. Regeneration of anion and cation resin beds used for ion exchange.
10. Medical: a) Taste improvement in oral medication, b) Improvement in rate and efficiency in renal dialysis, c) Burn debridment and dressing, d) Trauma bed mattresses and pads, e) Improved absorption of topically applied medical formulations, f) Speeds healing of non-healing wounds.
11. Agriculture: a) Colloidal minerals to replete the soil with essential minerals for more healthy and healthful crops, b) Moisture carrier, c) Nutrient carrier, d) Irrigation—decreased water requirements, e) Germination improvement, f) Dairy cleaners, g) Seeding of rain clouds
12. Building materials: a) Concrete, b) Blocks, c) Bricks, d) Paints, e) Pastes and glues, f) Insulation.
13. Fuels—Better dispersion and less sludging at low temperatures. Cleans injectors and cleans carbon from piston heads.
14. Waste Management—Improvement in bio-degradation.
15. Dyes.
16. Pulp and paper industry to control scale in equipment and improve the quality of paper.
17. Water based paints.
18. Clay products.
19. Commercial and industrial cleaners: a) Automotive (car wash), b) Airlines, buses, trains, c) other surfaces, d) laundries.
20. Aquaculture—Shrimp and catfish—improved taste and quicker growth.
21. Spray for fruit trees, vegetables, and other crops to protect from frost.
22. Printing dyes and inks—Better dispersment.
23. Natural herbal sweeteners.
24. Improved flow of liquids, semi liquids, slurries, and granular media in pipes, from tanks, or in or from other such containment devices.
25. Sequesterent for chemical warfare agents, for chemical spins, and in chemical processing.
26. Wetting agent for residential, commercial, and industrial applications and as an aid in fire fighting.
27. Deliming and descaling of pipes, tanks, boilers, and other items contacted with hard water.
28. Reactivation of ion exchange beds.
29. Replacement of carbon in steel production.
30. Control of off taste and odor in water and other systems.
31. Sequestration (selective and non-selective) of cations and anions in water and other systems.
32. Decrease friction of boat and ship hulls with water.
33. Antifreeze coolant for control of sludging at temperatures <−100° F. (below zero). Decreases viscosity and descales coolant surfaces while it controls corrosion.
34. Method for economical burning of high sulfur coal without polluting the environment.

The present invention includes an inorganic polymer electret in a colloidal state with a zeta potential between about 33 and 50 mV. Preferably, the zeta potential is between about 34 and 50 mV. More preferably, the zeta potential is between about 34 and 48 mV. Even more preferably, the zeta potential is between about 35 and 45 mV. Even more preferably, the zeta potential is between about 36 and 43 mV. Even more preferably, the zeta potential is between about 37 and 41 mV. Even more preferably, the zeta potential is between about 37 and 39 mV. Even more preferably, the zeta potential is between about 37 and 38 mV. Most preferably, the zeta potential is about 37.7 mV.

The accompanying drawings, which are incorporated and constitute a part of this specification, illustrate the presently preferred embodiment of the invention and serve to explain the principles of the invention.

BRIEF DESCRIPTION OF THE DRAWINGS

The best mode presently contemplated for carrying out the invention in actual practice is illustrated in the accompanying drawings, in which:

FIG. 6A. An electron photomicrograph of the colloid of the invention.

FIG. 15a is a schematic of the counter current scrubber of the invention. FIG. 15b is a cross section of the schematic of the current scrubber of the present invention.

a) PSRO Membrane Results

Figure 20:
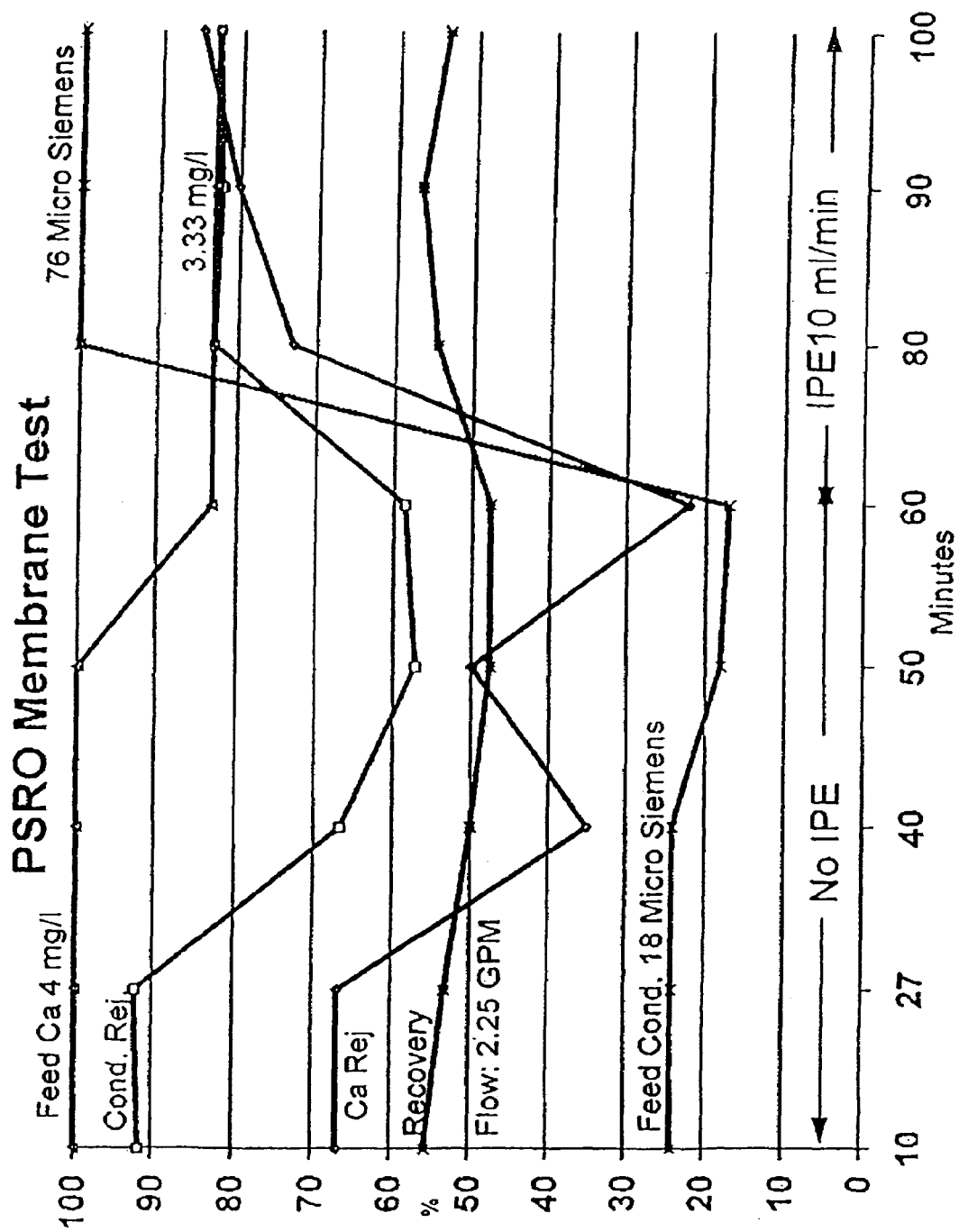
FIG. 20 represents selected data points, reduced to graphic form from the tests described in the Methods section.

FIG. 20 represents selected data points, reduced to graphic form from the tests described in the Methods section. As may be noted from the curve on feed water, the feed calcium concentration was 4 mg/l. The concentration fell to 3.33 mg/l just prior to the addition of IPE. This change was believed to be due to mixing within the large mix tank used. The conductivity rejection was 92% just after the membrane was regenerated with a 5% solution of sodium chloride. This high rejection rate persisted for about 27 minutes at a feed water flow of 2.25 gpm. The membrane then began to fail and the conductivity rejection dropped by 57% by 50 minutes. When IPE was added at 17.8 ppm, the rejection fraction returned to 83% at 80 minutes and maintained that fraction of rejection. Following regeneration of the membrane with the 5% NaCl solution the calcium rejection was 67%. When the membrane failed, the calcium rejection fell to 23%. When the IPE was added, the calcium rejection returned to 85%. As the membrane failed, the recovery dropped but returned to the original recovery by 90 minutes. Table 1 presents selected data points to demonstrate membrane failure and on-line regeneration and protection by IPE. Table 2 is a comprehensive listing of all data points from the experiment.

b) TFC Membrane Results

Figure 21:
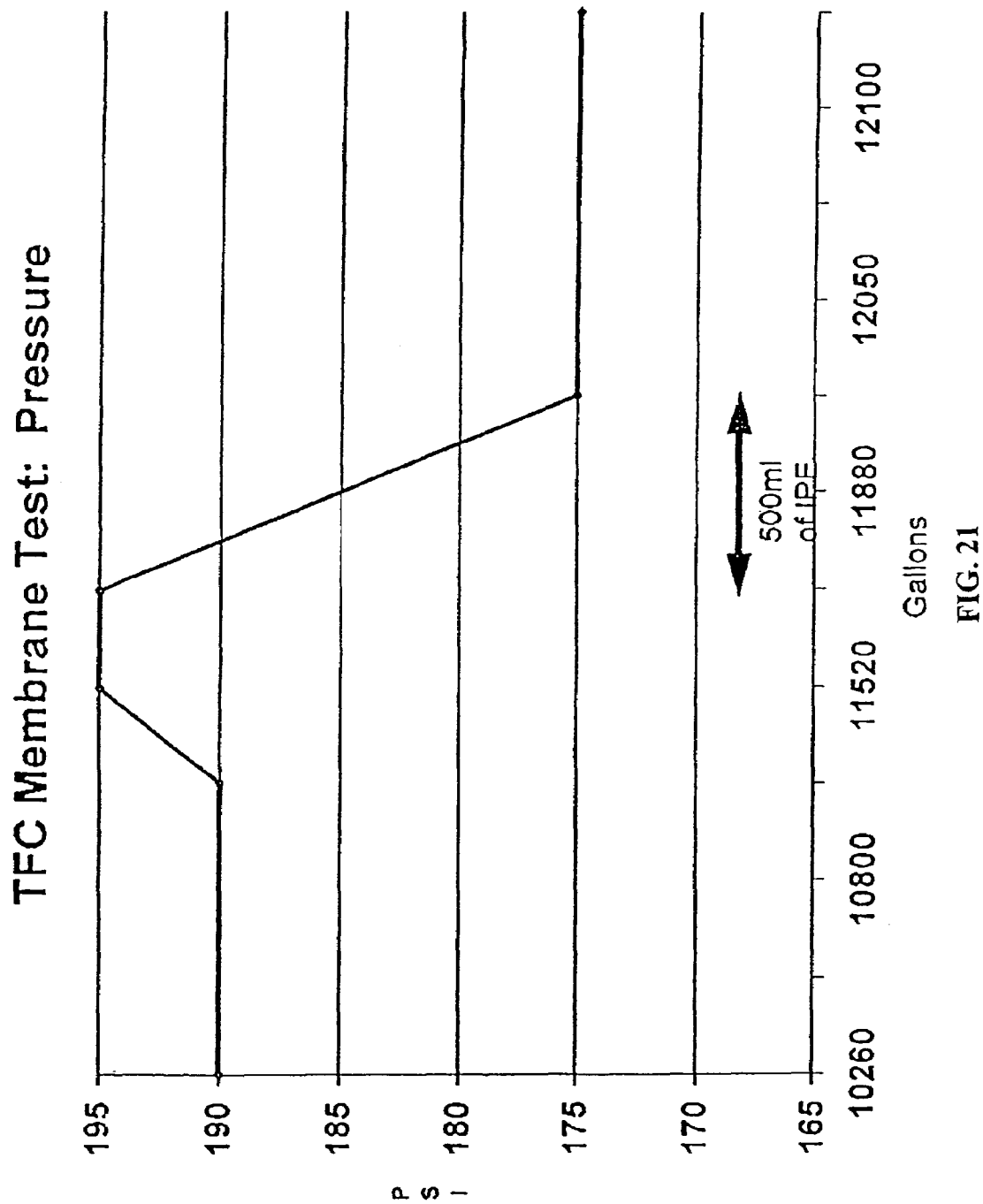
FIG. 21 is a representation of the pressure required to drive a flow of 3.2 gpm in a membrane which had been charged with IPE and then exposed to bolus of 500 ml of 5,000 ppm IPE.
Figure 22:
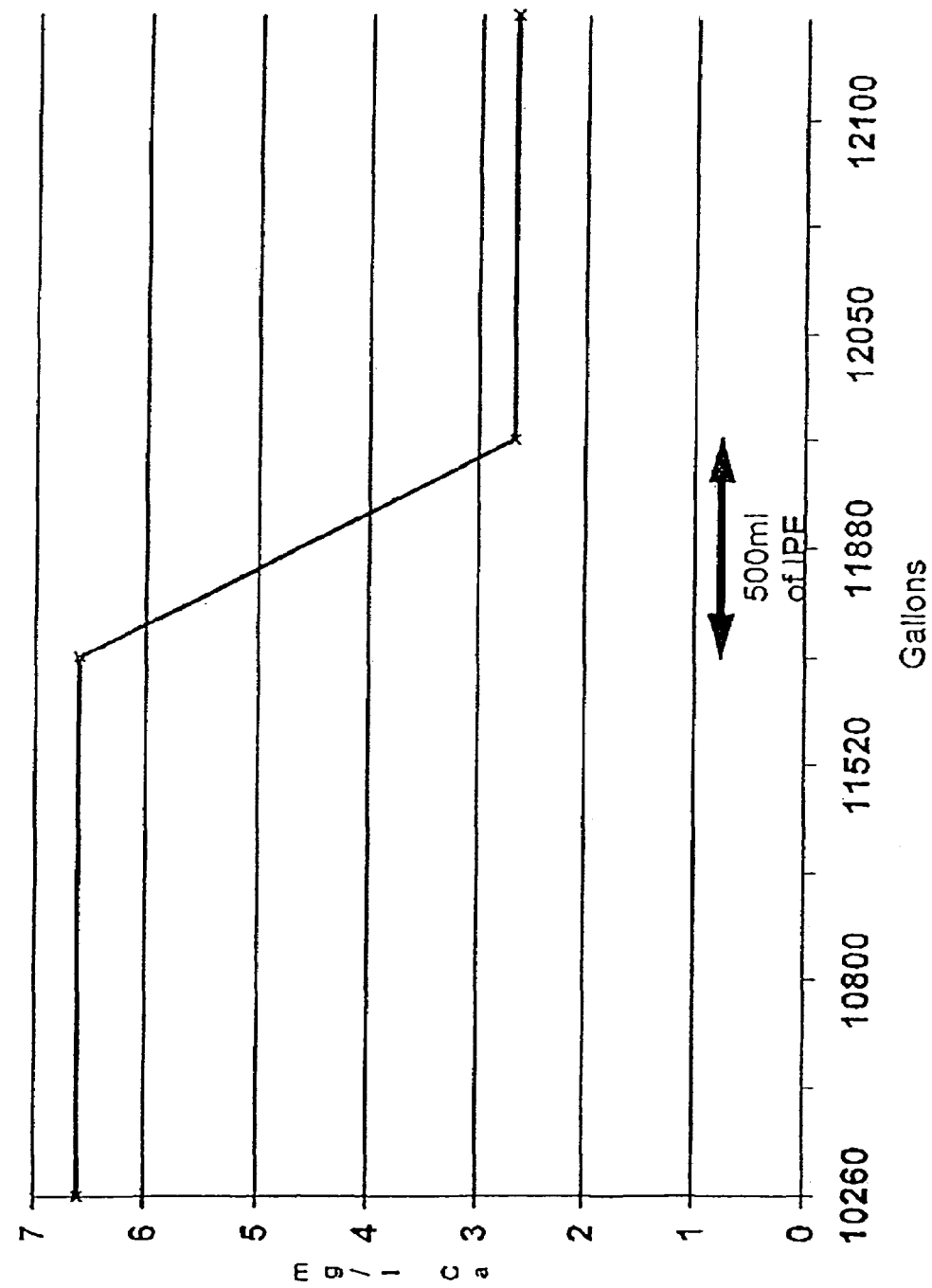
FIG. 22 is a graphic representation of the data from a membrane charged with IPE procesing 72 grain hardness feed water.
Figure 23:
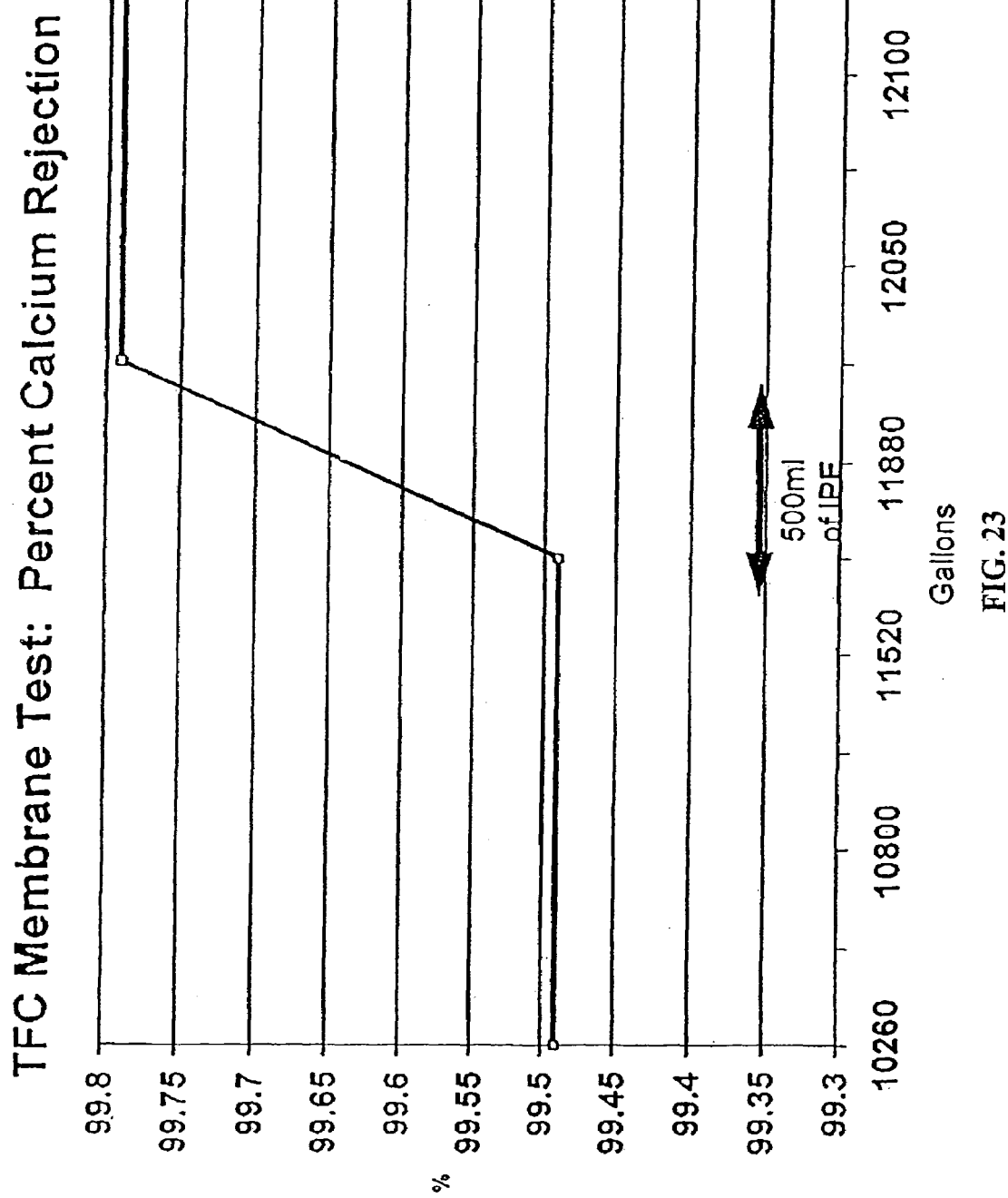
FIG. 23 shows percent calcium rejection as a function of IPE feed.

FIG. 21 is a representation of the pressure required to drive a flow of 3.2 gpm in a membrane which had been changed with IPE and then exposed to bolus of 500 ml of 5,000 ppm IPE. The feed water was unsoftened and contained 72 grains of hardness (1231 mg/l Ca). FIG. 22 is a graphic representation of the data from the same membrane charged with IPE processing the same 72 grain hardness feed water. When a bolus of IPE was exposed to the membrane, the mg/l of Ca dropped from 6.6 to 2.2. Therefore, as noted in FIG. 23, the percent calcium rejection increased from about 99.5 to approximately 99.8.

DETAILED DESCRIPTION OF THE INVENTION

Reference will now be made in detail to embodiments of the invention which are illustrated in the accompanying drawings. Throughout the drawings, like reference characters are used to designate like elements.

The versatile colloid of this invention comprises an aqueous solution with a wide range of stable active concentrations. The colloid may be converted to an active solid by two methods which will be described in detail. One produces a fluffy white powder and the other a hard crystallized matrix with significant applications in water treatment and conditioning. The colloid may also be effective for formulation of different salts of drugs to change their pharmocologic behavior.

Aqueous Colloid (Inorganic Polymer Electret)

Silica is commonly found in waters across the U.S. in levels from near 0 to well over 100 ppm ("Water Treatment Fundamentals" WQA). Activated but unstable sodium silicate is used in potable water as a coagulant, for control of corrosion and as a stabilizing/sequestering agent for iron and manganese. The U.S. Environmental Protection Agency (USEPA) does not regulate sodium silicate as a contaminant for potable water. The USEPA's listing of acceptable drinking water additives includes various sodium silicate products. There are no upper limits published nor regulated. Silica in the public water systems of the 100 largest cities in the U.S. range from near zero to 72 ppm with a median level of 7.1 ppm (National Academy of Science "Drinking Water and Health.")

Hard water defined as more than 7 grains per gallon is found in the potable water supplies of greater than 90% of the United States. Currently, only about 10% of that market uses water softeners. The low utilization appears to be due to the cumbersomeness of the available systems and the fact that they are ion exchange resin systems which release large amounts of sodium into the home water supply. There is clearly a need for alternative water conditioning and softening. The present invention softens the water by releasing an active colloid of silica into the water which sequesters calcium, magnesium, iron, and manganese, as well as other charged contaminants. The colloid also cleans, protects from corrosion and descales the pipe lines as well as fixtures and appliances. The water improves skin hydration, is better for cooking and washing dishes and clothes. Detergent needs go down dramatically, to as much as one half in most cases. The preferred embodiment is a solid crystalloid matrix which releases active colloid as the water flows through the media bed. The IPC (Inorganic Polymer Crystalloid) does not solubalize completely in a filter cylinder. The soluble form is in equilibrium with a layer of hydration which is in equilibrium with the colloid of the crystalloid. When the water flow begins, the silica colloid is metered off the layer of hydration. A media bed of one to two pounds will supply an average home with 40 grains per gallon of hardness for three to four months without replenishing the bed. A similar media bed of IPC may be used instead of sodium chloride or potassium permanganate to reactivate ion exchange media beds. The media bed is attached to the side of the ion exchange resin tank and, for about 20 minutes per day, the resin is backwashed with silica colloid from the IPC filter bed. If a mixed media bed (i.e. cationic and anionic) is employed, it will remove $Ca^{++}$, $Mg^{++}$, $SO_4^{2-}$, $NO_3^-$, $Fe_2^+$ and $Mn_2^+$. The iron and manganese are removed by placing the IPC filter in the line following the resin bed. IPC sequesters $Fe^{++}$ and $Mn_2^+$. The mixed resin bed will remove the unwanted $Ca^{++}$, $Mg^{++}$, $SO_4^-$, and $NO_3^-$. The backwash of the resin bed will reactivate the cationic sites because of the high affinity which the silica colloid has for the $Ca^{++}$ and $Mg^{++}$. In addition, the $SO_4^-$ and $NO_3^-$ will backwash out in the waste because of the high affinity of the colloid for the anion sites on the resin bed.

The negative sites which are available as the $Ca^{++}$, $Mg^{++}$ and iron are sequestered, attract and bind hydrogen($H^+$) ions which are in the water and hydrogen ions are also contributed by the sequestered acid which is sequestered as the titration takes place during the synthesis of IPC.

Figure 1:
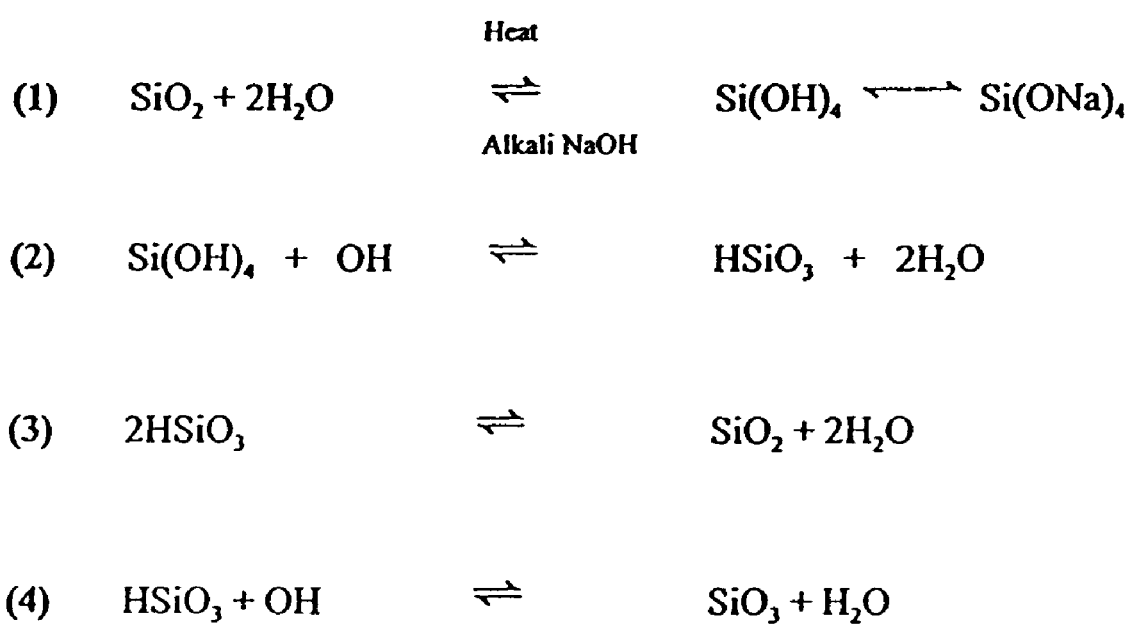
FIG. 1. Chemical equation representation for manufacture of sodium silicate.
Figure 2:
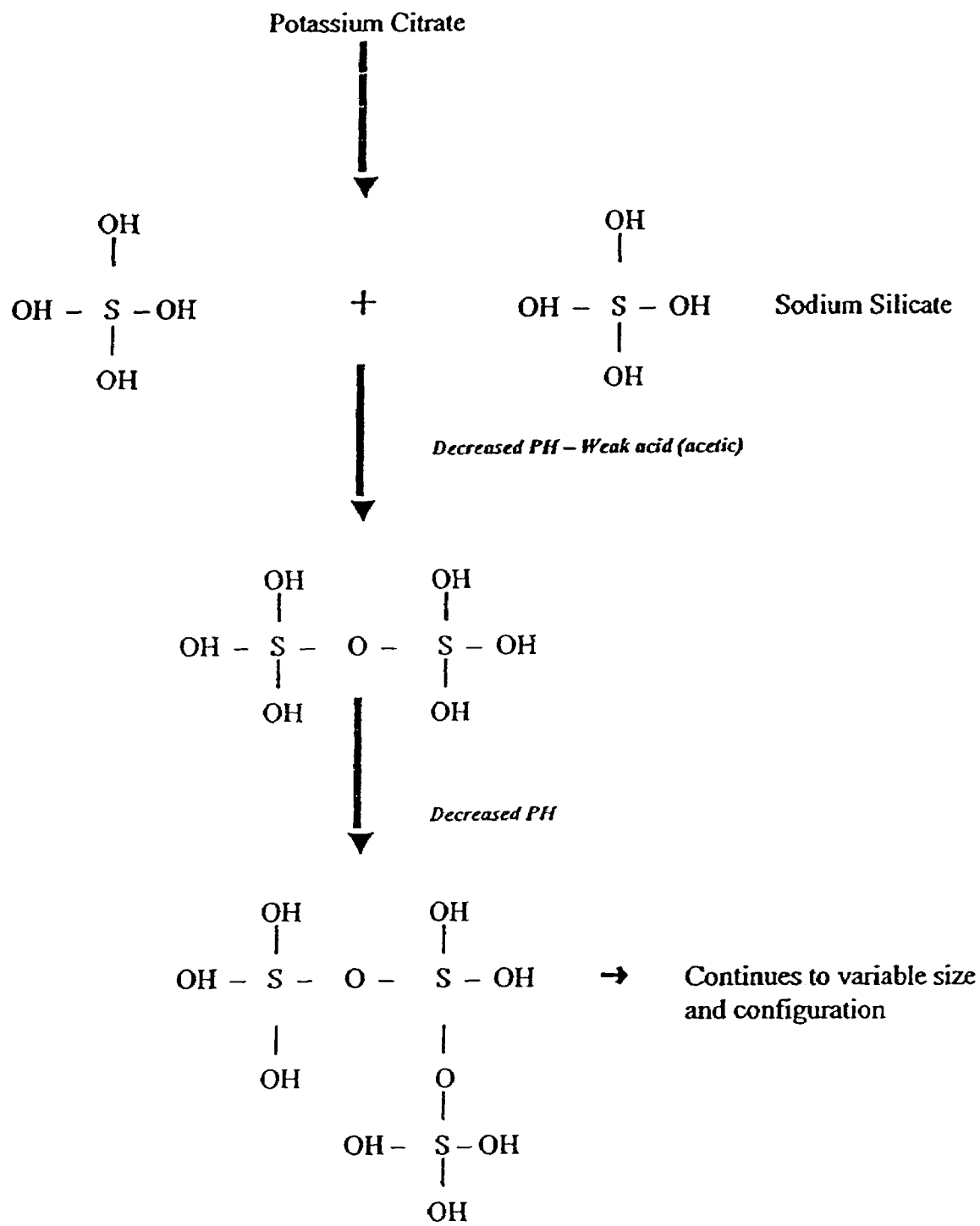
FIG. 2. Believed polymerization of $Si(OH)_4$ when titrated with HAC. Formation of silica polymer.
Figure 3:
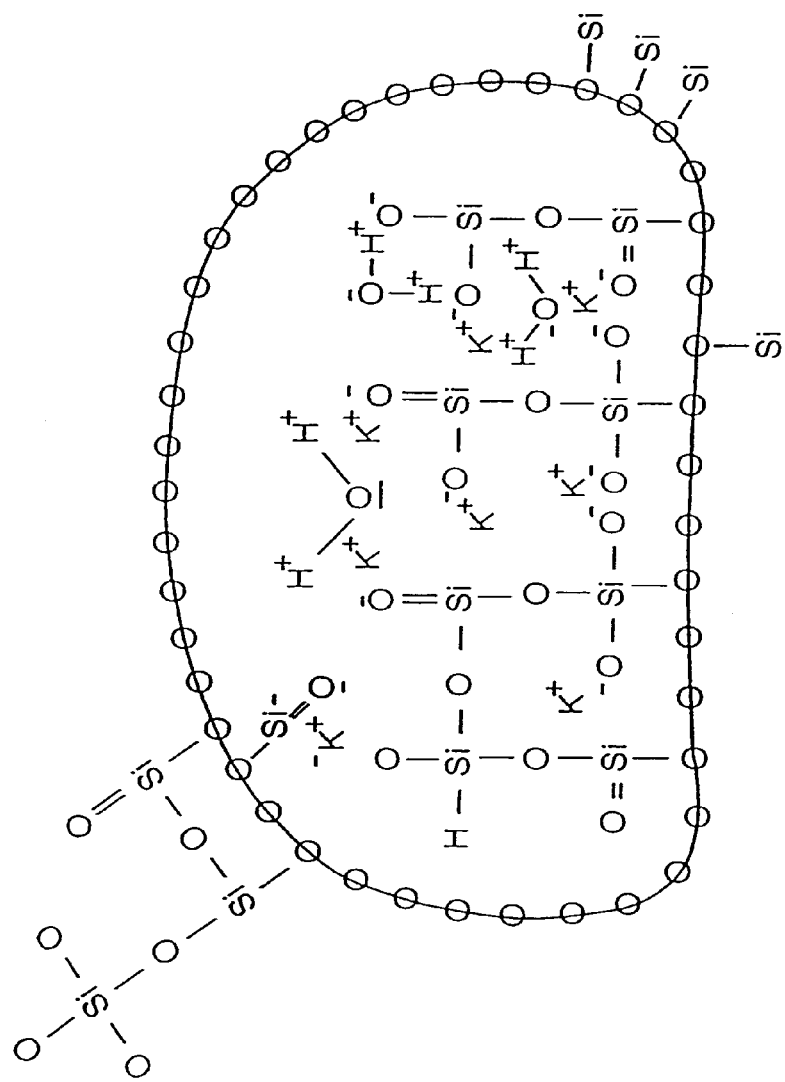
FIG. 3. Believed evolution of the polymer in the generator of the invention, with a steep gradient magnetic field with $K^+$ ions as the nucleus and stabilized by the $K^+$ and about water.
Figure 4:
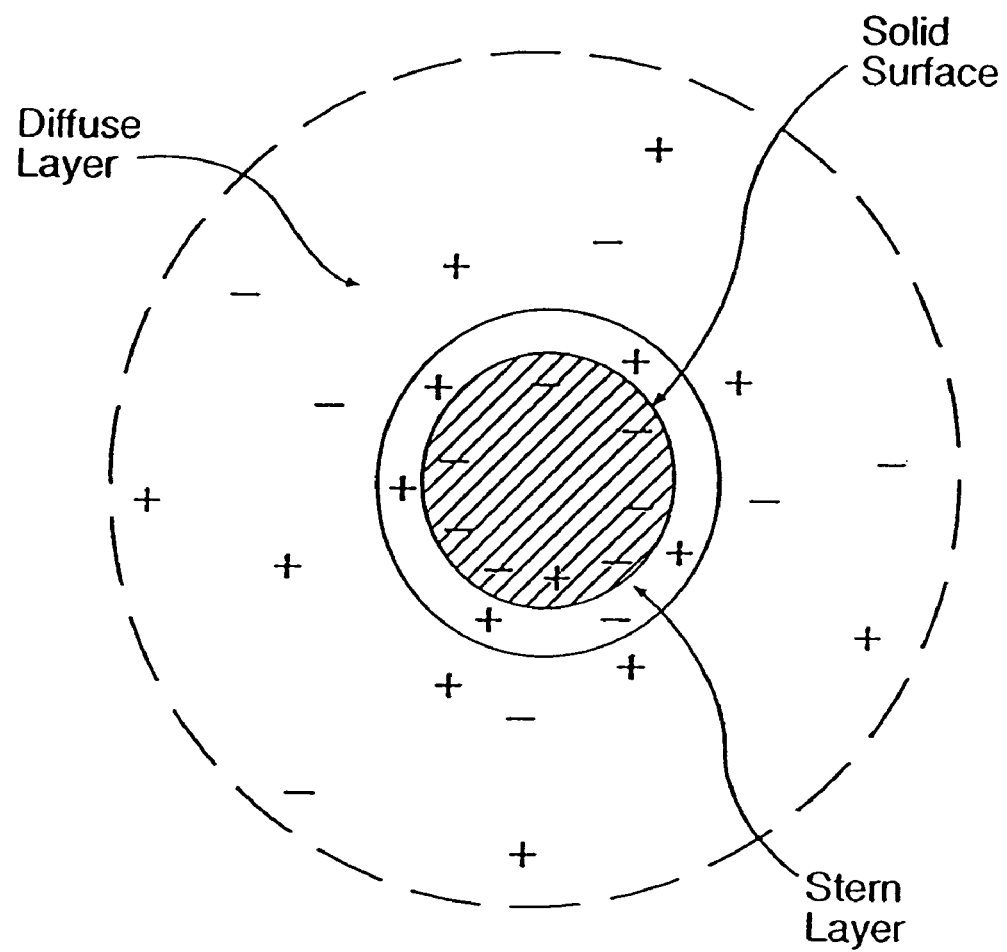
FIG. 4. Bound water on a typical colloidal particle made by standard activation techniques.
Figure 5:
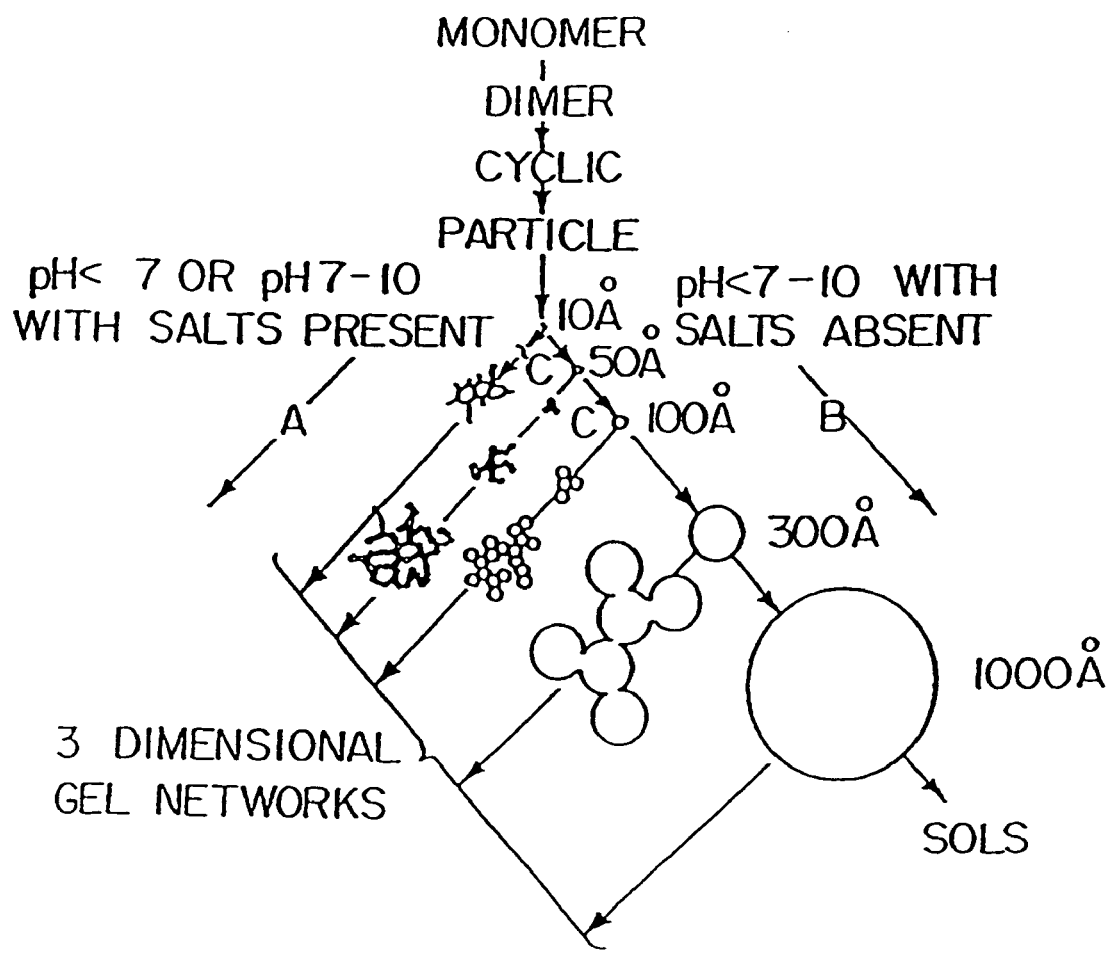
FIG. 5. A schematic representation of the believed polymerization behavior of silica.
Figure 6:
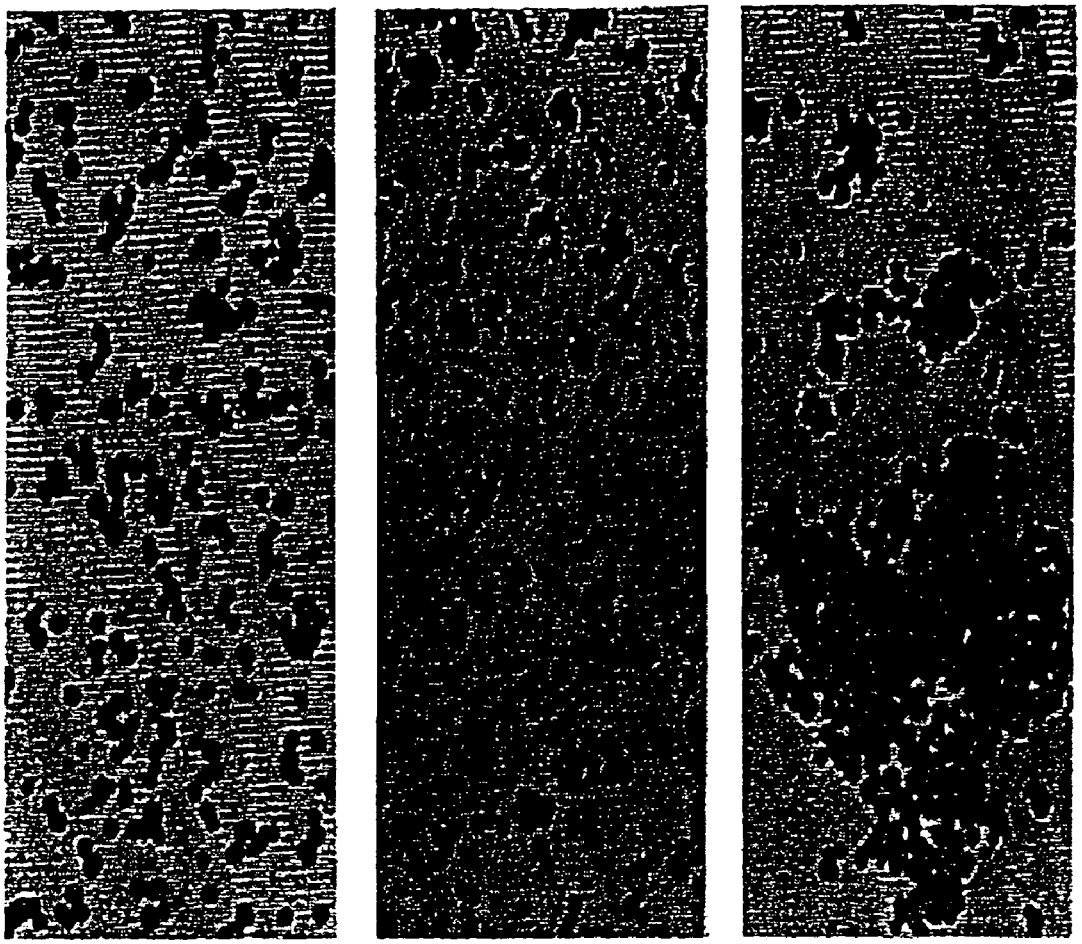
FIG. 6. Electron photomicrographs of silica particles made by standard activation techniques compared to electron photomicrographs of 6A colloid of the invention.

As is noted in FIG. 1, the process of this invention is initiated by dissolving silicon dioxide(sand) in a strong alkali solution sodium or potassium hydroxide. If potassium hydroxide is used, a more tightly bound product is formed. The sand, alkali and water are heated to >1000° C. The mixture is approximately 27% silicate by weight in 3 to 4 molar alkali (NaOH or KOH). The active ingredient is $Si(OH)_4$. As is noted in FIG. 2, the particle formed by the silica colloidal polymer is stabilized by adding tripotassium citrate to the reaction mix. If one uses sodium citrate instead of potassium citrate in this invention, a poorly active and unstable product results. Potassium is important in synthesis of the three dimensional colloid of the invention. The concentration in the final solution is ~0.01 moles/liter of potassium citrate in a solution of 5,000 ppm. If KOH is used in the reaction mix, a more stable, solid material will result. FIG. 3 is illustrative of this versatile and extremely active colloid. FIG. 4 represents the typical double layer of water found bound on a typical silica colloid. The colloid of the invention is estimated to have some twenty layers of bound water. FIG. 5 is a schematic representation of the believed polymerization behavior of silica in the standard activation process. The colloid of the present invention is much more tightly bound with more extensive branching of the polymer. FIG. 6 represents electron micrographs showing stages of aggregation of 35 millimicron particles.

FIG. 6a is an electronmicrograph of the colloid of the invention revealing a high degree of bound water.

Figure 7:
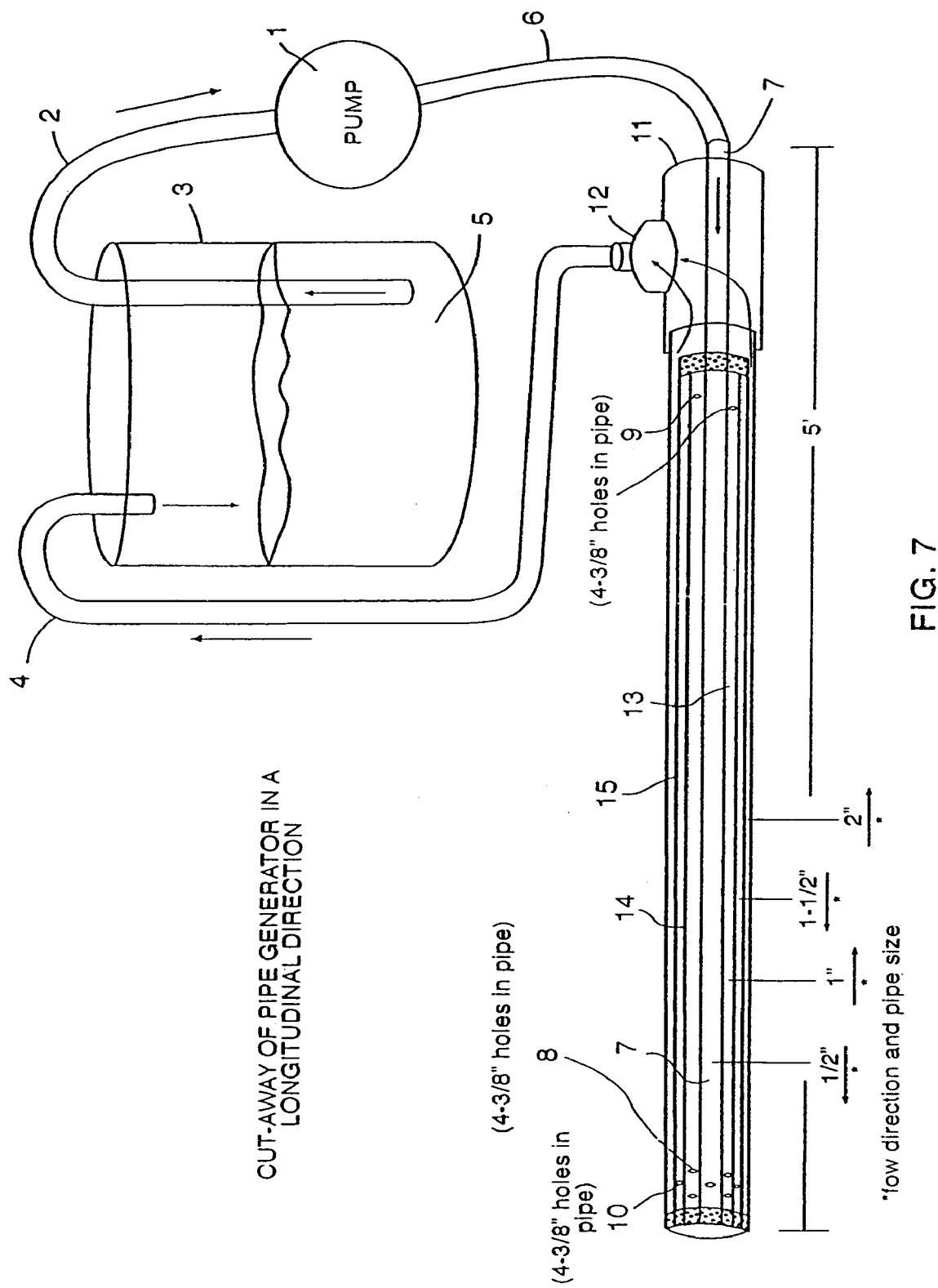
FIG. 7. Comprehensive schematic drawing of the generator of the invention.
Figure 8:
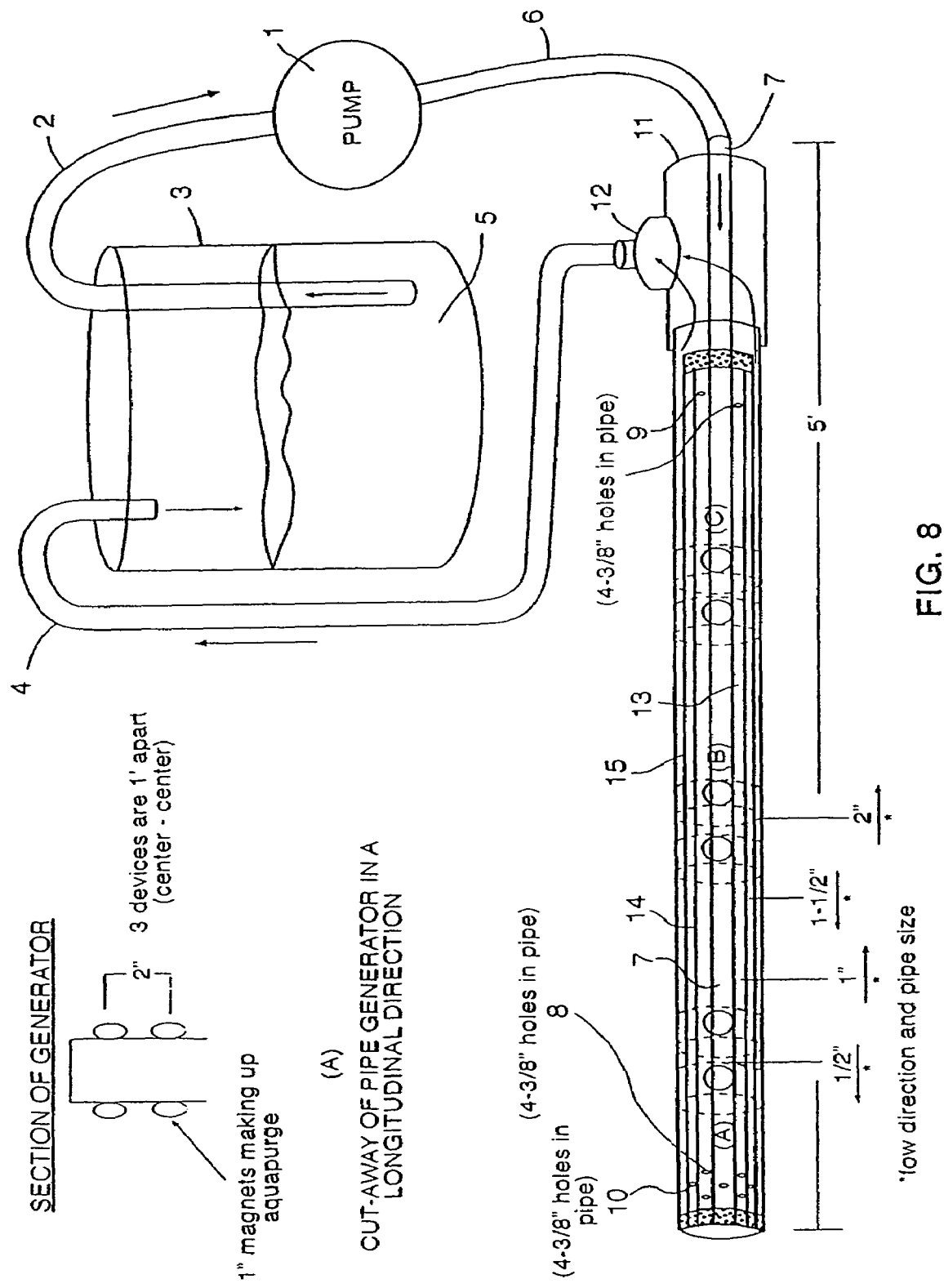
FIG. 8. An overlay of the schematic drawing of the generator of the invention demonstrating three magnetic quadripolar generators.

The generator of the invention is displayed in FIGS. 7 and 8. The functioning of the generator of the invention entails a pump(1) which picks up fluid of the invention 5 which is contained in containment means 3 and flows through conduit 2 and through pump 1. The pump 1 generates a velocity of 4 to 10 gpm and a pressure of 20 lbs per square inch. Fluid at this aforementioned pressure and velocity flows through conduit 6 and enters conduit means 7. The fluid flows through conduit means 7 and exits through holes 8 into conduit (1" pipe) means 13, the fluid then flows in the opposite direction, it then exits through holes 9 and reverses direction again through conduit (1.5" pipe) means 14. The fluid exits conduit means 14 through orifices 10 into conduit means 15, this fluid enters chamber 11 and exits the generator proper through conduit 12 and is carried back to containment means 5 through conduit means 4.

Figure 9:
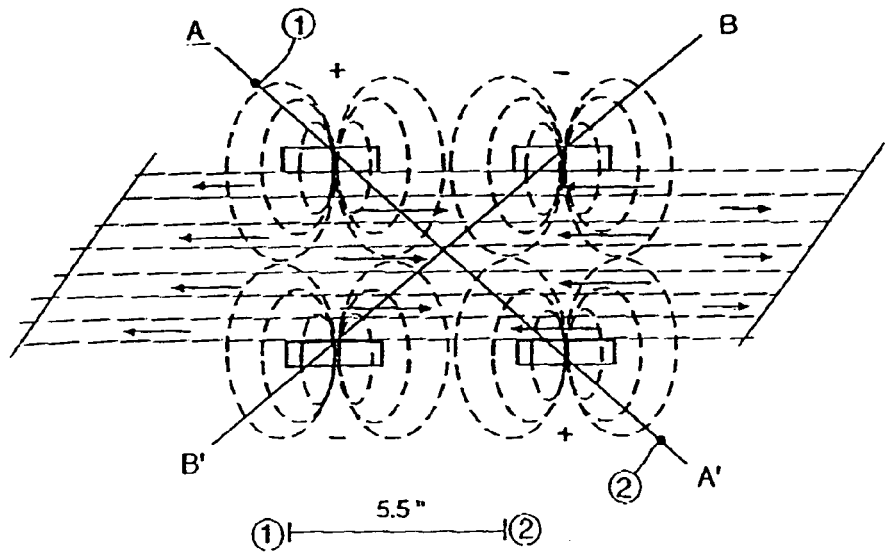
FIG. 9. Detailed schematic drawing of the magnetic quadripolar generator which in part demonstrates its uniqueness.
Figure 9:
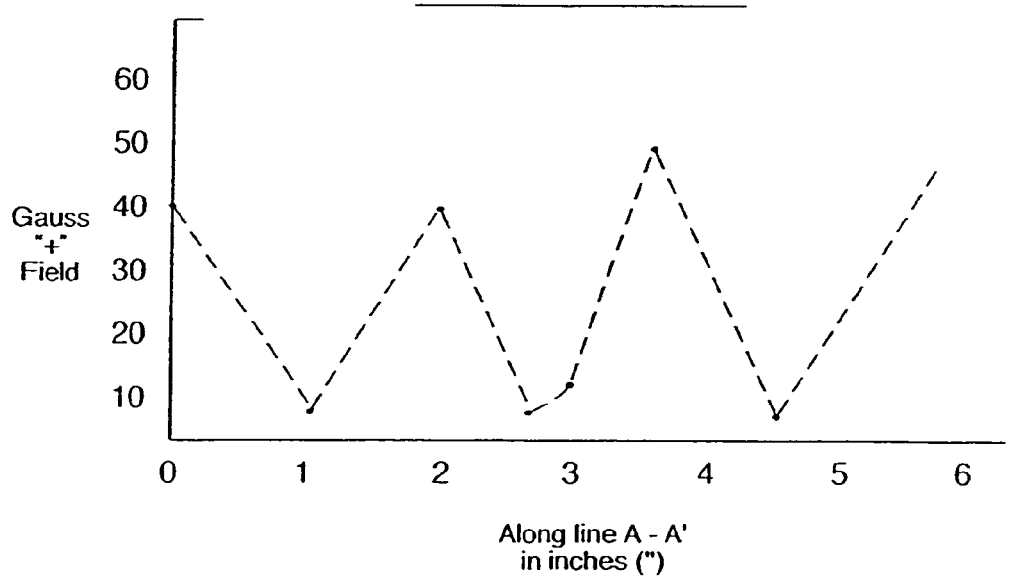

FIG. 8 illustrates the function and location of the magnetic booster units of the invention. High velocity prolonged flow through the counter current device of the invention will generate the colloid of the invention because of the counter current charge effect which generates multiple bi-directional magnetic fields which generate an electrostatic charge on the adjacent moving charged colloidal particles moving in the counter current process. If one adds the magnetic booster units of FIG. 8 (units A, B and C), the electrostatic charge builds on the colloid much faster. As can be noted from FIG. 9, there are multiple gradients within the pipe line in the z axis, these gradients also exist in the x and y axis. The multiple gradient effect is responsible for the dramatic electrostatic charge which builds on the particle as the generator continues to process the material.

The detail manufacture of the product entails the following, but not limited to: Eight gallons of distilled water are placed into containment means 5. The water is circulated through the generator circuit at 4.5 to 5 gpm and 20 lbs/in$^2$ for one hour. Sodium Silicate is placed into the generator as it continues to run at 4.5 to 5 gpm. This silicate is titrated in over 20 minutes (a total of 5,000 ppm of silicate based on the weight of SiO$_2$ on a weight basis is a 27% solution in 4.0 molar NaOH. After the sodium silicate is all in the system, the generator continues to run for one hour. Approximately 2,000 gms of tripotassium citrate is added as a slurry to the mixture over 20 minutes. The generator is run for an additional hour under the same conditions. The pH at this point is >10.0. The solution continues to run through the generator at 4.5 to 5.0 gpm as the mix is titrated with 2.0 molar acetic acid at a rate of 10 cc/min. The mixture is titrated to a final pH of 7.6 and then continued to run through the generator for an additional one hour. The material at this point is a cloudy, very dense colloid(IPE).

The inorganic silicate polymer electret in a colloidal state has a zeta potential between about 33 and 50 mV, between about 34 and 50 mV, between about 34 and 48 mV, between about 35 and 45 mV, between about 36 and 43 mV, between about 37 and 41 mV, between about 37 and 39 mV, between about 37 and 38 mV, or about 37.7 mV.

Figure 10:
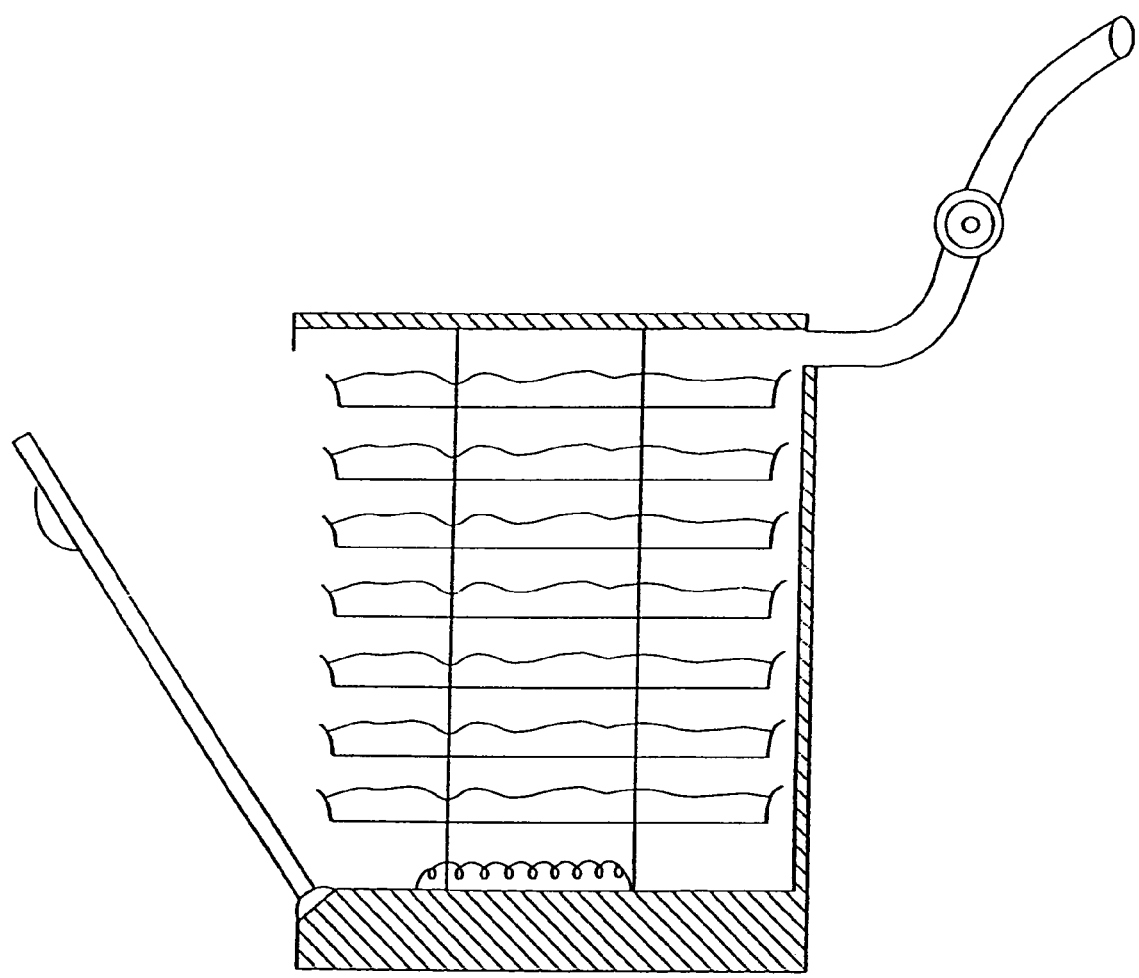
FIG. 10. A schematic view of the degassing/drying ovens which can be used in the invention.
Figure 11:
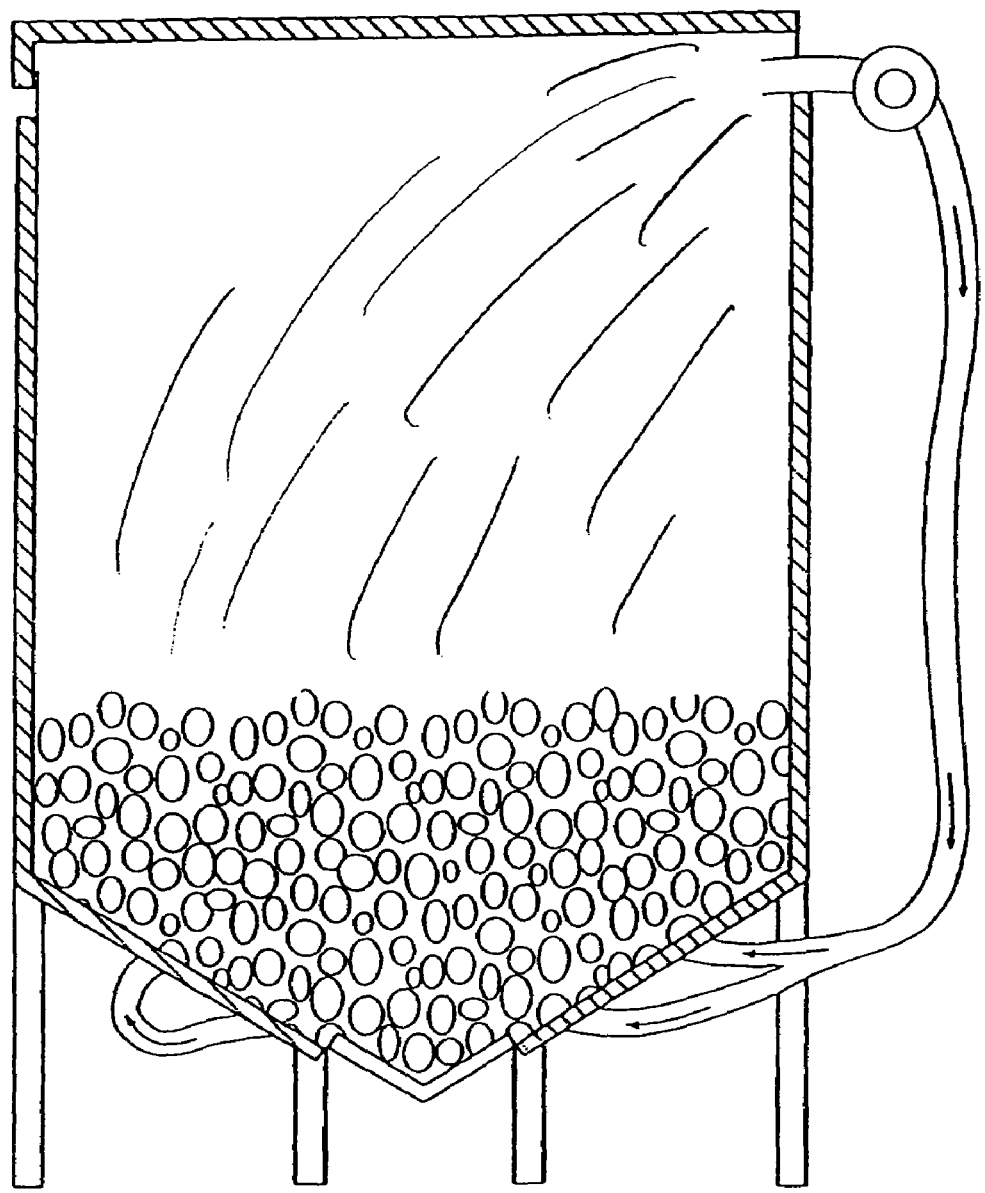
FIG. 11. A schematic view of curing bins which cure the product of the invention.

The IPE is pumped into stainless steel trays 2"×18"×24". The trays are placed into vented drying ovens at 150° to 175° F. (FIG. 10). The material is cured for 3 days. The resulting product is an off white crystalloid with a density of ~1.1 to 1.2, solubility in distilled water is 6 ppm. Bound water>50% odor-none, taste-none. The material at this point is refereed to as inorganic polymer crystalloid (IPC). It is allowed to cure in plastic bags at 70° F. and 40 to 60% humidity but not limited to this temperature and humidity. This may be accomplished in temperature and humidity controlled curing bens if the material in large quantity for commercial or municipal use as in FIG. 11.

Figure 12:
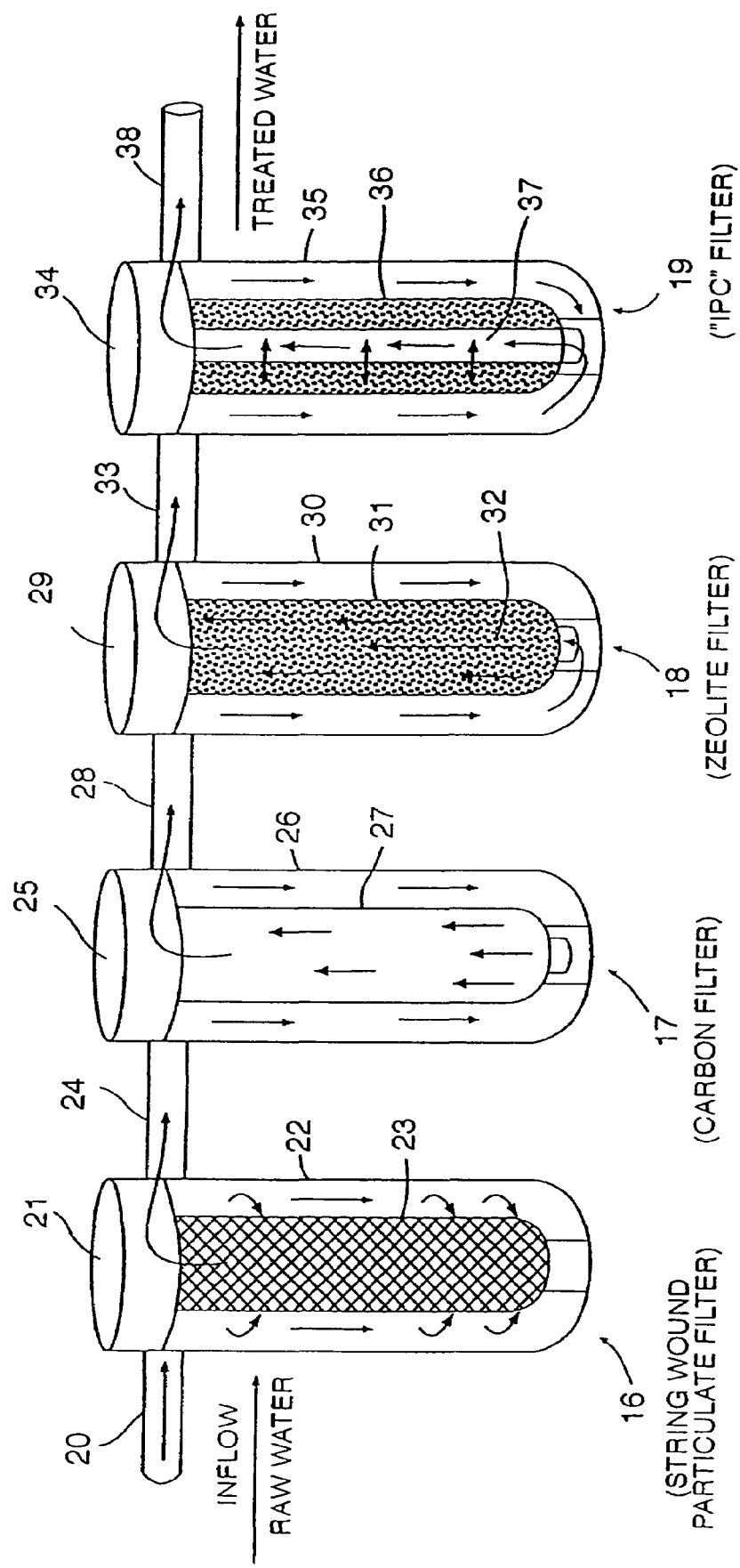
FIG. 12. A schematic representation of the preferred embodiment of the technology for use in hard water with bad odor and bad taste.

A preferred embodiment of the technology is in combination with other media beds in the treatment of a broad spectrum of bad water with hardness, iron, bad taste and odor (see FIG. 12). The preferred sequence is raw water inflow through conduit 20 into canister 21. Water flows downward in water containment means 22 and in through the pores of the string wound filter (20 microns) 23. Water with particulates removed flows out through conduit 24 into canister 25 down through containment means 26 and up through carbon bed 27. Some odor, taste and organic insecticides and pesticides are removed. The water then flows out through conduit 28 into canister 29 containing a natural zeolite the water flows down containment means 30 into media containment means 31 and through zeolite bed 32. The outflow has had some removal of nitrites, ammonia compounds and hardness. Water flows out through conduit 33 and into canister 34 and downward in containment means 35 and up through the center of cartridge 36 and up through the center of the IPC filter bed. The core is formed by attaching a fine mesh filter screen around a plastic cylinder skeleton. As the water flows through the filter core IPC dissolves and is drawn through the screen as IPE. A water concentration of 1 ppm of silica colloid will bind a high percentage of the calcium, magnesium and iron as well as other (+) ions. This sequestration is not breakable by EDTA titration. Therefore, if the EDTA method of calcium titration is employed for measuring calcium, the method doesn't detect all of the calcium. Bad odor and taste contaminants are also sequestered.

Enhanced performance of ion exchange polymers may be obtained by substitution of the salt backwashing with an inorganic polymer electret (IPE) or by use of elution of its solid form (IPC). While much is written about "hard water," there is a lack of finite definition. Water "hardness" can commonly be recognized when scum forms around the bathtub. For convenience and communication, "hardness" is measure by the level of calcium and magnesium bicarbonates in water and together represent total hardness (TH). Usually, water above three grains (52 ppm) per gallon hardness is labeled "hard." To establish uniform degrees of hardness, the water quality association and the American Society of Agricultural Engineers have adopted the hardness levels on the following Table.

| Term | Grains/Gallon | Mg/Liter |
| --- | --- | --- |
| Soft | Less 1.0 | Less 17.0 |
| Slightly Hard | 1.0 to 3.5 | 17.1 to 60 |
| Moderately Hard | 3.5 to 7.0 | 60 to 120 |
| Hard | 7.0 to 10.5 | 120 to 180 |
| Very Hard | 10.5 and over | 180 and over |

Figure 14:
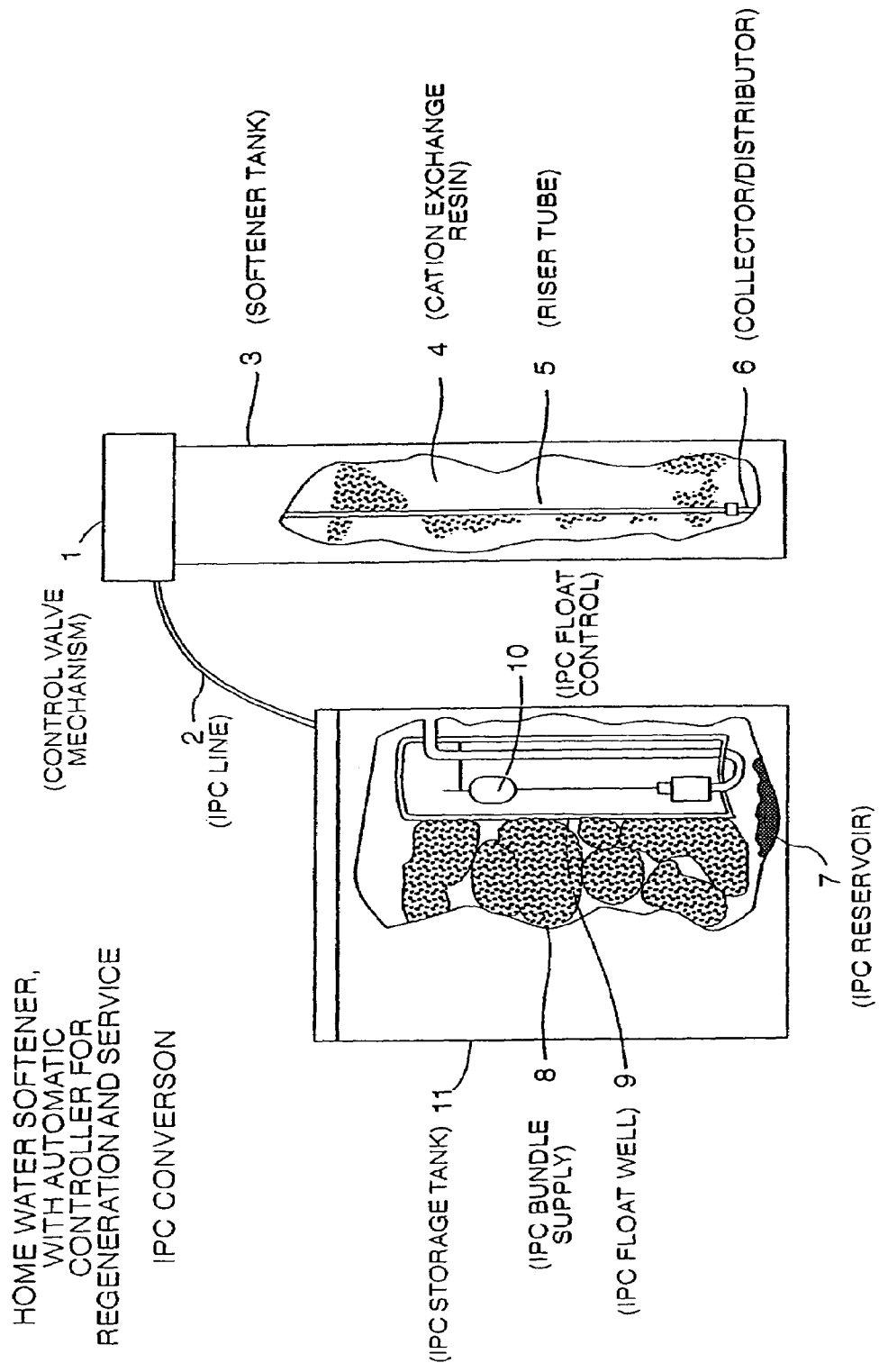
FIG. 14. Figure of the ion exchange resin embodiment employed in this invention or applied to current salt regenerated ion exchange units in which the salt has been replaced with bags of IPC.

The softener of the current invention (FIG. 14 consists of a pressure vessel (tank) 3 containing a bed of cation exchange resin 4 which removes the calcium and magnesium and thereby does the softening, a separate vessel to store the IPC 11 and provide the apparatus to make up the IPE solution needed for regeneration, and the control value 1 which directs the flow of IPE laden water through the cycle of regeneration and service. Sulfonated polystyrene copolymer cation exchange resin is used almost exclusively today in home and business water softeners. The experience of units which are currently in service and are the subject of this patent reveals that the IPC generated media beds, in sulfur ($H_2S$) contaminate 74 grain water, work longer and with better quality water than do the salt regenerated beds.

The molecule representation of FIG. 1 represents the charged inorganic polymer of the invention.

The very strong net negative charge of the IPE allows the backwash water to sequester calcium, magnesium and iron, thereby allowing it to carry the hardness factors out in the backwash water, thereby reactivating the polymer. The calcium ions are replaced by IPE potassium and hydrogen ions on the active resin sites.

Figure 15:
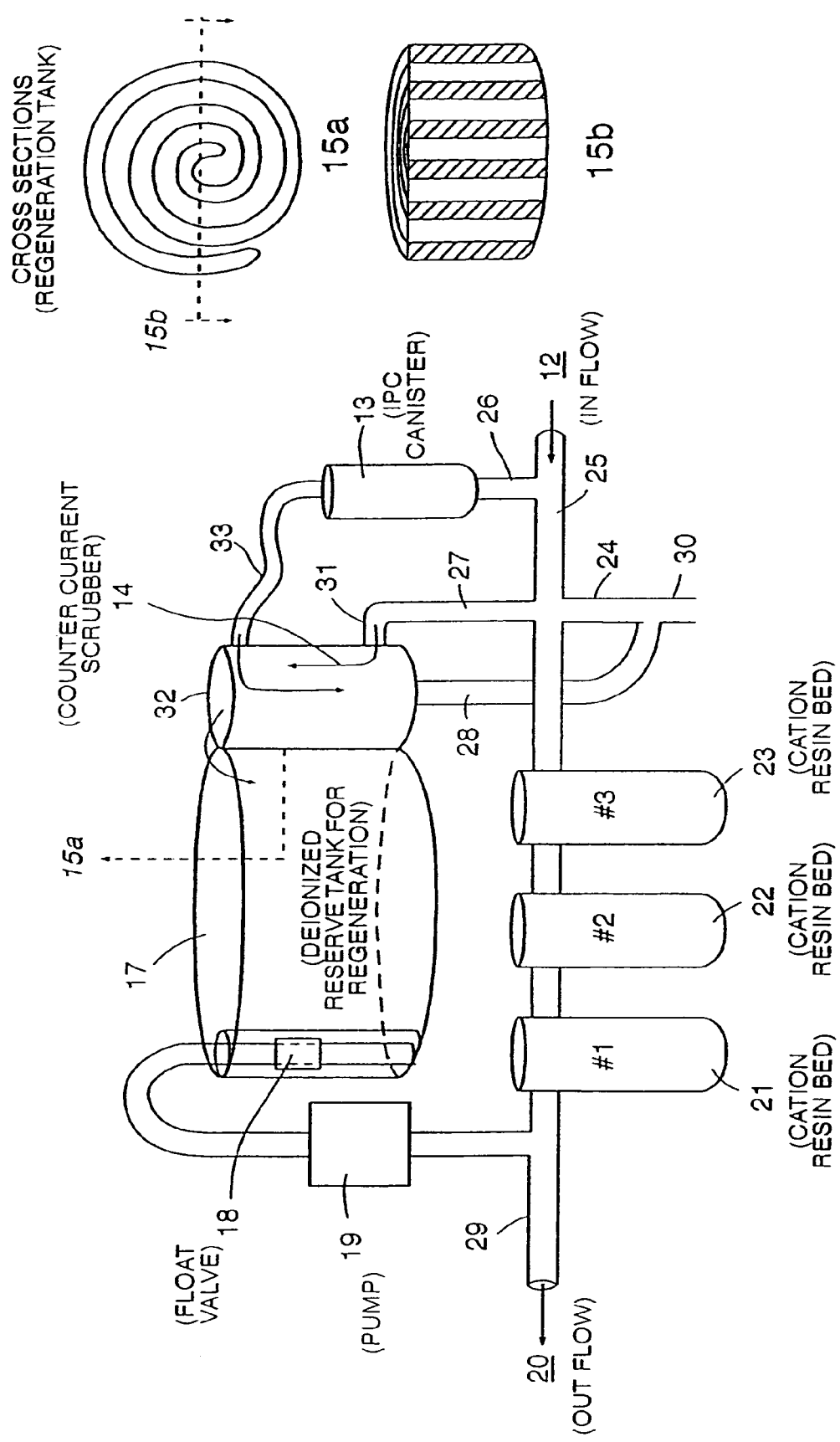
FIG. 15. A more compact and efficient ion exchange unit utilizing stored deionized water and a counter current scrubber to circulate deionized IPE laden water through the ion beds to increase the efficiency.
Figure 16:
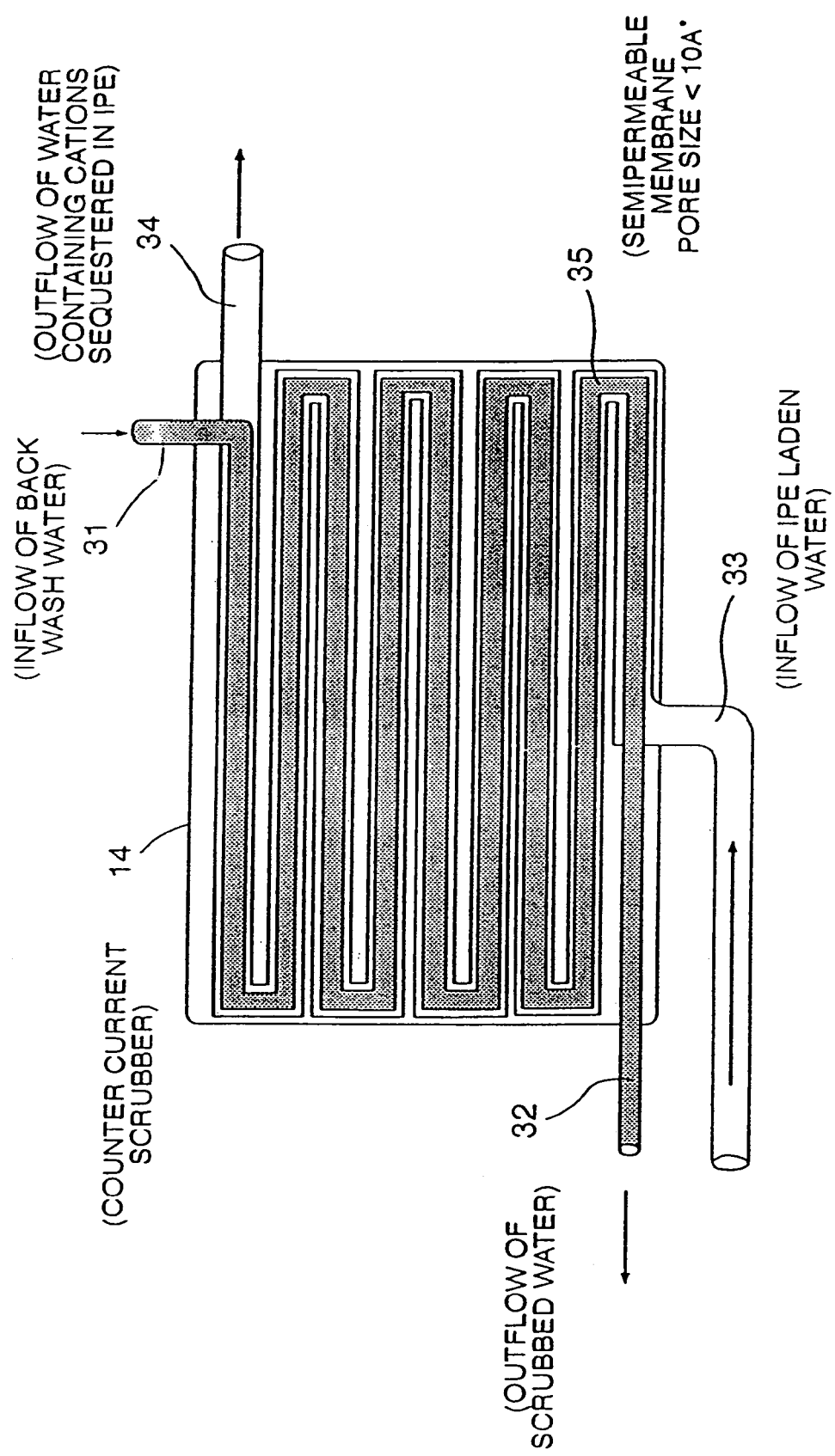
FIG. 16. is a detailed drawing of a counter current scrubber of the invention.
Figure 17:
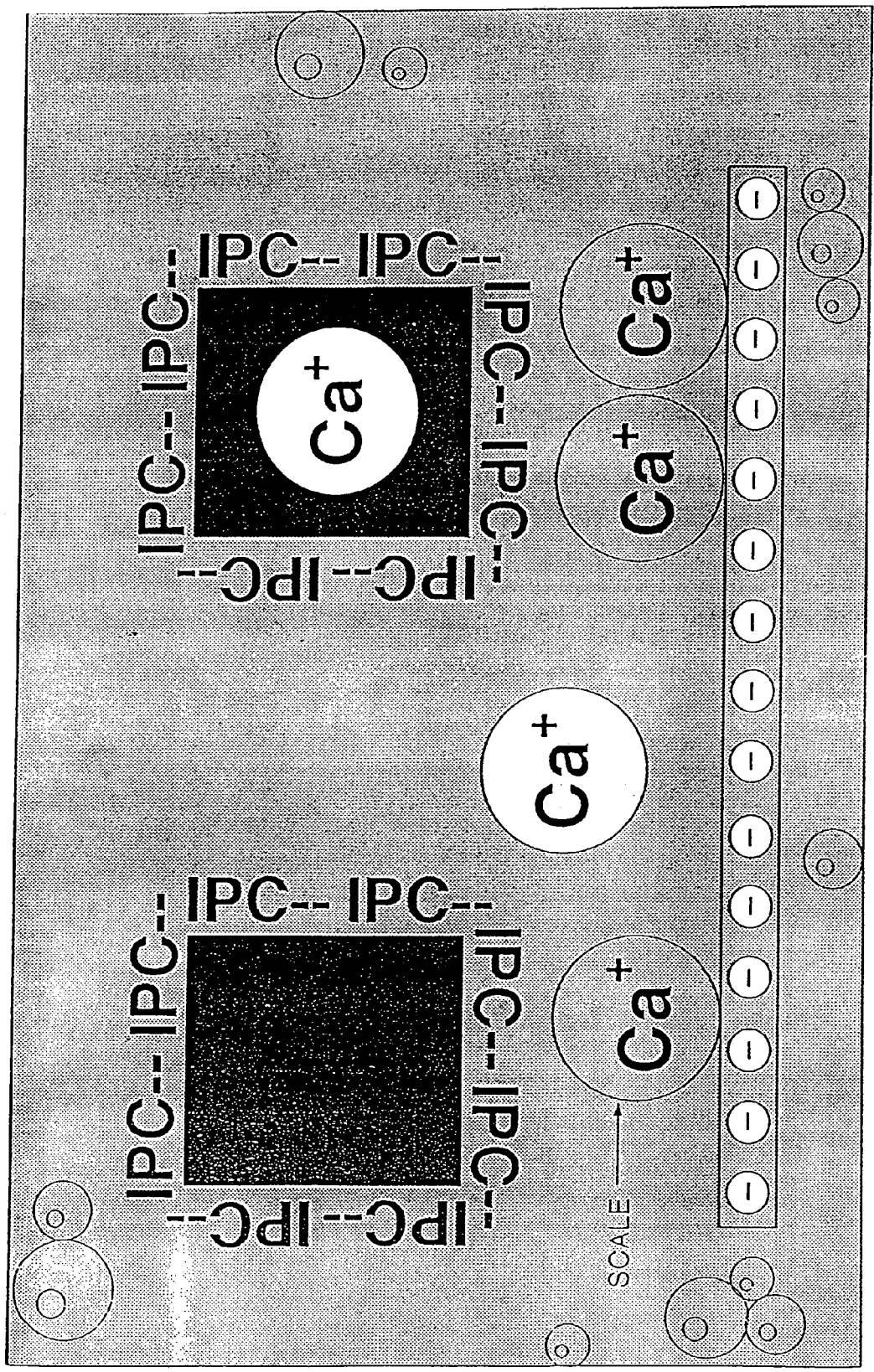
FIG. 17. Represents the sequestration process by which IPE inactivates cations.

FIG. 15 represents a more compact ion exchange softener. Water flows through the inflow pipe (12) through bed (23), then (22) and (21). The IPE sequesters 40% of the cations. Therefore, pass through three small columns will remove 94% of the cations therefore outflow (20) will be 94% free of hardness ions. The deionized reserve tank (17) will fill until float valve (18) stops the flow. This reserve tank, when full, will begin to leach IPE of the insert (15a, 15b) and will be ready for regeneration. When the regeneration cycle begins, valve (29) closes, valve (25) closes, (27) closes, (28) closes and (24) opens. Pump (19) begins to pump IPE laden, deionized water in a back flow fashion through the resin beds. The beds are flushed with ⅓ of the reservoir water and discharged out of the discharge port (30). The second phase of regeneration involves leaving valve (29) closed, leaving valve (25) closed, opening valves (26), (27) and (28). Then turning on pump (19) to circulate the IPE through the three resin beds. The fluid goes through the counter current scrubber (FIG. 16) to keep it free of cations during the regeneration process. IPE ladened water enters the scrubber through conduit (33). It then flows past scrubbed out flow water in conduit (32), which is a porous conduit lined with a semipermeable membrane of a pore size of less than 10 Å. This counter current flow allows scrubbing of the hard water by diffusion across a semipermeable membrane (permeable to $Ca^{++}$ and $Mg^{++}$, but not to IPE) and counter current flow. FIG. 17 represents the sequestration of calcium ions by IPE. IPE attaches to the calcium scale thereby imparting a negative charge to the scale. The negatively charged scale then repels off the surface of the appliance or pipe line.

Due to the progressive contamination of water on earth and the antiquity of current water technology, there is a need for a reliable, rapid and relatively inexpensive method of total purification of water at point of use as well as for industrial and municipal use.

Figure 18:
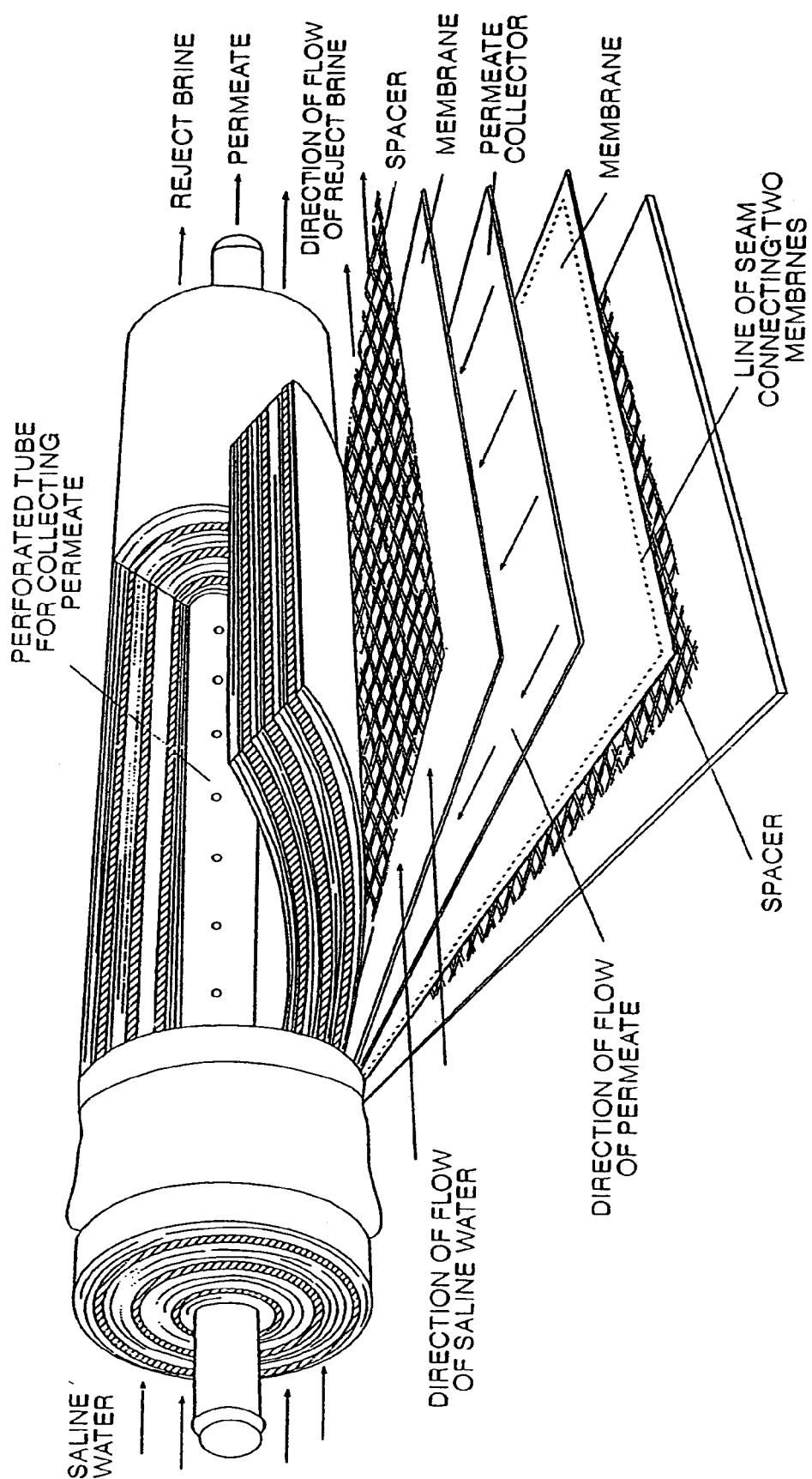
FIG. 18. A representation of a spiral wound module for reverse osmosis (courtesy of Degremont, 183 Avenue de Juin 1940-92508 Rueil Malmaison CEDEX-France).

The treatment technology of current invention employs technology which consists of standard reverse osmosis (RO) hard water and membranes (FIG. 18). The RO units are modified in that an injection port and chemical feed pump for IPE is added immediately prior to the normal feed water inlet port. For a detailed description of a pilot version of the embodiment see addendum "Use of a Proprietary Additive—"IPE" (Inorganic Polymer Electret) for RO (reverse osmosis) membrane performance enhancement.

Figure 13:
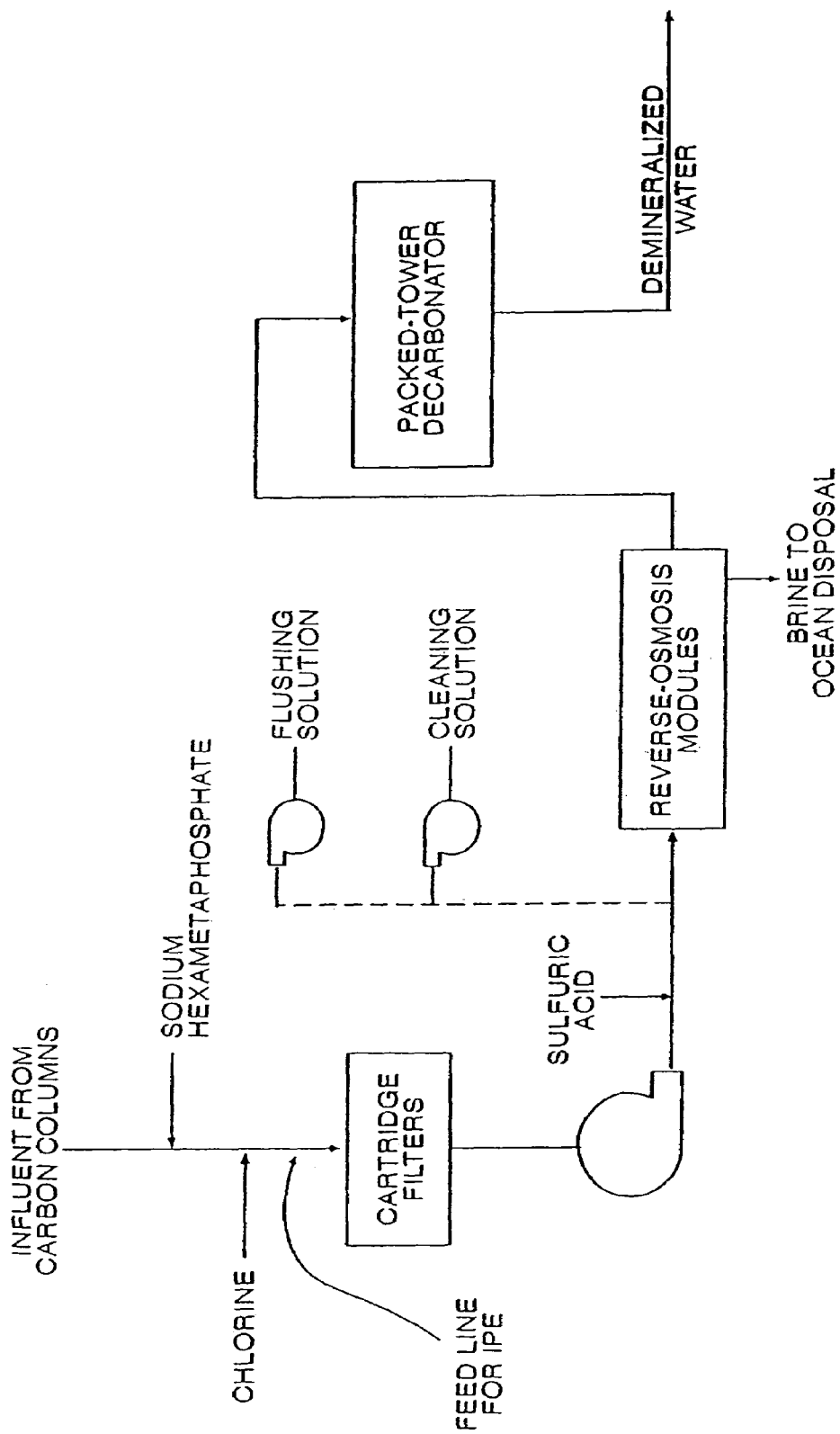
FIG. 13. Represents a schematic diagram of a water purification system using reverse osmosis in Orange County, Calif. (water factory number 21).
Figure 19:
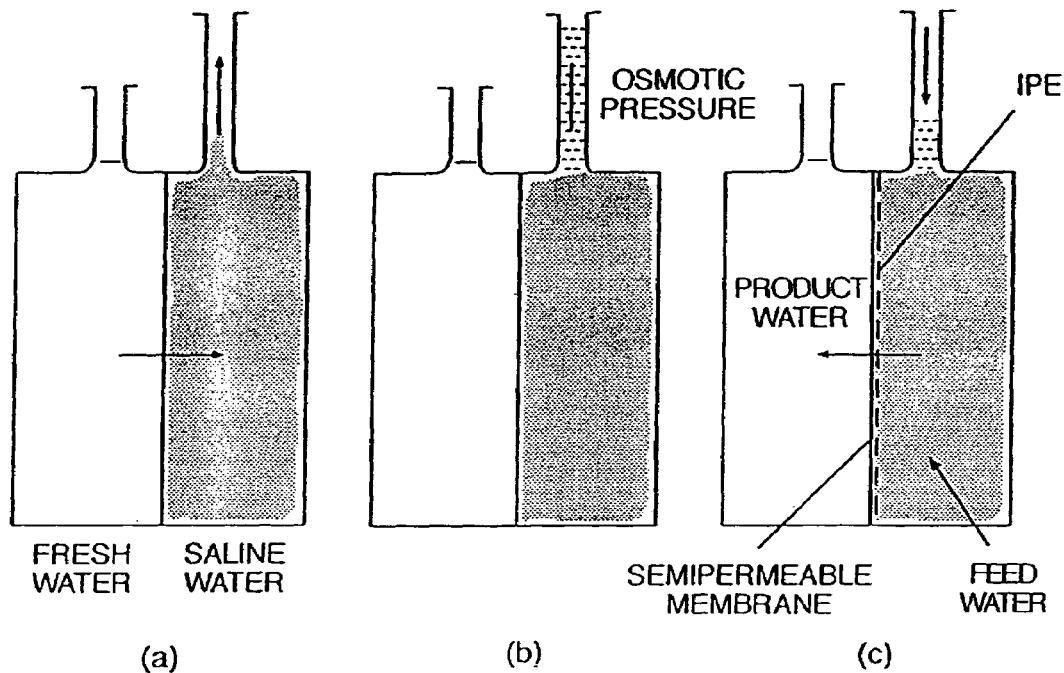
FIG. 19. Represents: (a) Direct osmosis; (b) Osmosis equilibrium; and (c) Reverse osmosis along with a graphic depiction of the protective mechanism of IPE for charged membranes of reverse osmosis units.
Figure 19:
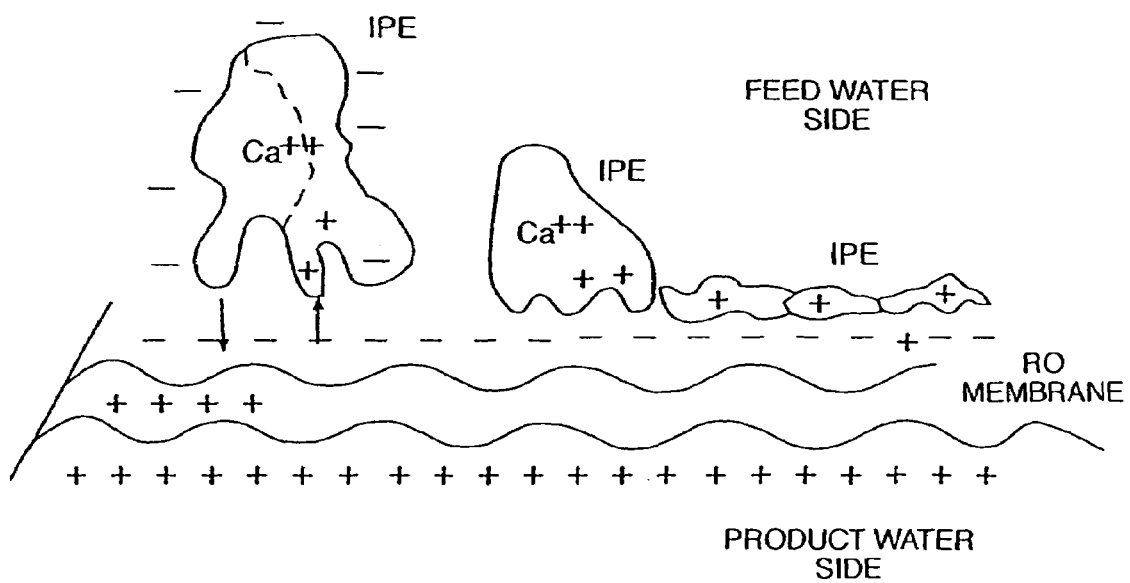

FIG. 19 is a depiction of the basic principles of reverse osmosis and the mechanism by which IPE protects the membrane from scaling. Scaling is secondary to bonding of calcium carbonate and/or magnesium carbonate to the membrane (primarily on the feed water side). IPE sequesters the calcium and therefore presents a negative charge to the negatively charged membrane, thereby preventing scaling and descaling any accumulated scale. FIG. 13 is a depiction of a proposed placement of a feed line for IPE.

Use of a Proprietary Additive—"IPE" (Inorganic Polymer Electret)—For RO (Reverse Osmosis) Membrane Performance Enhancement Introduction:

This report is a presentation of the limited evaluation of two different RO membrane elements for potential application in improving the efficiency and reducing the cost of reverse osmosis in the water market place.

Background of the Technology:

The technology used in this experiment is IPE, a proprietary inorganic polymer which is colloidal in nature with a manipulable net charge. The technology can and has been effective in the enhancement of RO membranes which are active and passive in function.

Materials and Methods:

a) Test Setup and Methods for PSRO

The tests were performed on a Series 250 RO system equipped with PSRO (polysuflone reverse osmosis) type elements. Feed water was obtained by processing well water containing approximately 1300 mg/l of calcium carbonate to a level of 3.33 to 4.0 mg/l of calcium carbonate. The feed water was then fed to the Series 250 system via an external pump. The Series 250 system is modified in that an injection port and chemical feed pump for IPE have been added immediately prior to the normal feed water inlet port. The system was run with the recovery valve in the maximum recovery position with an inlet flow of between 2.05 and 2.25 gallons per minute. The operating pressures of the system for both the pump and the reject ran between 180 psi during IPE feed and 195 psi during the non IPE feed periods. Samples were pulled approsimately every 15 minutes for both feed and product waters. Conductivities were measured using a Myron L EP conductivity meter. Calcium carbonate levels were obtained by EDTA titration method per "Standard Methods" 314 B. Immediately prior to start of testing of PSRO membranes were regenerated using 15 ligers of 5% NaCl solution. The IPE injection started at approximately the 70 minute mark without any adjustments to any other parameter. IPE injected into the feed stream was injected at a rate of approximately 10 ml per minute. The concentration of the IPE was 15,000 ppm of active material which equates to 17.8 ppm in the water which reached the membrane.

b) Test Setup and Methods for TFC

The tests were performed on a Series 250 RO system equipped with TFC Polyamide elements (US filter no. CDRC 025 SI & SH). The feed water was obtained from a well with calcium carbonate levels up to 1300 mg/l (76 grains hardness). This water was then diluted with processed water to obtain various levels of hardness. The feed water was fed to the Series 250 system via an external pump with pressures of 40 to 60 psi. The series 250 system was modified in that an injection port and chemical feed pump for IPE were added immediately prior to the normal feed water inlet port. The system was run with the recovery valve in the maximum recovery position with an inlet flow of between 2.1 and 3.2 gallons per minute. The operating pressures of the system for both the pump and the reject ran between 180 and 195 psi during non IPE periods and dropped to as low as 175 during IPE feeds. Samples were pulled at intervals from both feed and product waters. Conductivities were measured using a Myron L EP conductivity meter. Calcium carbonate levels were obtained by EDTA titration method per "Standard Methods" 314 B. Water of hardness from 20 to 76 grains was employed for the testing. IPE was normally injected at various rates but mostly at 10 ml/minute and in bolus of up to 500 ml. Due to the apparent adequacy of small bolus injections, a continuous feed was not employed for most of the test. The concentration of IPE was 5,000 ppm of active material.

Results:

The results of these two experiments are presented in table and graph form.

a) PSRO Membrane Results

FIG. 20 represents selected data points, reduced to graphic form from the tests described in the Methods section. As may be noted from the curve on feed water, the feed calcium concentration was 4 mg/l. The concentration fell to 3.33 mg/l just prior to the addition of IPE. This change was believed to be due to mixing within the large mix tank used. The conductivity rejection was 92% just after the membrane was regenerated with a 5% solution of sodium chloride. This high rejection rate persisted for about 27 minutes at a feed water flow of 2.25 gpm. The membrane then began to fail and the conductivity rejection dropped by 57% by 50 minutes. When IPE was added at 17.8 ppm, the rejection fraction returned to 83% at 80 minutes and maintained that fraction of rejection. Following regeneration of the membrane with the 5% NaCl solution the calcium rejection was 67%. When the membrane failed, the calcium rejection fell to 23%. When the IPE was added, the calcium rejection returned to 85%. As the membrane failed, the recovery dropped but returned to the original recovery by 90 minutes. Table 1 presents selected data points to demonstrate membrane failure and on-line regeneration and protection by IPE. Table 2 is a comprehensive listing of all data points from the experiment.

b) TFC Membrane Results

FIG. 21 is a representation of the pressure required to drive a flow of 3.2 gpm in a membrane which had been changed with IPE and then exposed to bolus of 500 ml of 5,000 ppm IPE. The feed water was unsoftened and contained 72 grains of hardness (1231 mg/l Ca). FIG. 22 is a graphic representation of the data from the same membrane charged with IPE processing the same 72 grain hardness feed water. When a bolus of IPE was exposed to the membrane, the mg/l of Ca dropped from 6.6 to 2.2. Therefore, as noted in FIG. 23, the percent calcium rejection increased from about 99.5 to approximately 99.8.

TABLE I

PSRO TEST

| Gallons | Feed Concentration | Calcium Rejection % | Conductivity Rejection % | Amount of IPE Added |
|---|---|---|---|---|
| 22 | 0.233 Gr, 4 mg/l, 18 µS | 65% | 91.6% | 0 |
| 91 | 0.233 Gr, 4 mg/l, 18 µS | 35% | 66% | 0 |
| 177 | 0.195 Gr, 3.33 mg/l, 76 µS | 72.9% | 82.9% | 17.8 ppm |
| 220 | 0.195 Gr, 3.33 mg/l, 76 µS | 80 | 85% | 17.8 ppm |

Note that IPE added is not necessarily the optimum dosage but simply an arbitrary amount selected for this particular test.

TABLE 2

FEED WATER SOURCE
Modified Well Water
4 mg/l Ca
RO ELEMENT
PSRO
DATE: Sept. 19, 1997

| ELASPED TIME MIN.s | TOTAL GAL. | FEED | | | | | PRODUCT | | | | REJECT | |
|---|---|---|---|---|---|---|---|---|---|---|---|---|
| | | FLOW GPM | COND. MICRO SIEMENS | Ca mg/l | HARDNES GR/GAL | PRES | FLOW GPM | COND. MICRO SIEMENS | Ca mg/l | HARDNES GR/GAL | FLOW GPM | PRES |
| | | | 18.00 | 4 | 0.233918 | | 1.25 | | | | 1 | |
| 10 | 22.5 | 2.25 | 18 | 4 | 0.233918 | 195 | 1.25 | 1.5 | 1.33 | 0.0777778 | 1 | 195 |
| 27 | 62.45 | 2.35 | 18 | 4 | 0.233918 | 195 | 1.25 | 1.4 | 1.33 | 0.0777778 | 1.1 | 195 |
| 40 | 91.05 | 2.2 | 18 | 4 | 0.233918 | 195 | 1.1 | 6 | 2.6 | 0.1520468 | 1.1 | 195 |
| 50 | 112.1 | 2.1 | 14 | 4 | 0.233918 | 195 | 1 | 6 | 1.99 | 0.1163743 | 1.1 | 195 |
| 60 | 133.1 | 2.1 | 13 | 3.33 | 0.194737 | 195 | 1 | 5.4 | 2.6 | 0.1520468 | 1.1 | 195 |
| 80 | 177.1 | 2.2 | 76 | 3.33 | 0.194737 | 190 | 1.2 | 13 | 0.9 | 0.0526316 | 1 | 190 |
| 90 | 199.1 | 2.2 | 76 | 3.33 | 0.194737 | 185 | 1.25 | 13.5 | 0.66 | 0.0385965 | 0.95 | 185 |
| 100 | 219.6 | 2.05 | 76 | 3.33 | 0.194737 | 180 | 1.1 | 13 | 0.5 | 0.0292398 | 0.95 | 180 |

TABLE 2-continued

FEED WATER SOURCE
Modified Well Water
4 mg/l Ca
RO ELEMENT
PSRO
DATE: Sept. 19, 1997

| ELASPED TIME MIN.s | PERCENT RECOVERY | REJECTION % BY COND. | REJECTION % BY Ca |
|---|---|---|---|
| | #DIV/01 | 100.00% | 100.00% |
| 10 | 55.56% | 91.67% | 66.75% |
| 27 | 53.19% | 92.22% | 66.75% |
| 40 | 50.00% | 66.67% | 35.00% |
| 50 | 47.62% | 57.14% | 50.25% |
| 60 | 47.62% | 58.46% | 21.92% |
| 80 | 54.55% | 82.89% | 72.97% |
| 90 | 56.82% | 82.24% | 80.18% |
| 100 | 53.66% | 82.89% | 84.98% |

NOTES: IPE feed started at 70 minutes at a flow of 10 ml per minute.

Conclusions and Discussions:

The data presented in this report supports the position that the small amounts of IPE injected onto the TFC membrane enhances and protects the membrane for extended periods of time froum fouling or scaling from very hard, high mineral content water containing calcium and magnesium carbonate, iron, and hydrogen sulfide. The Tfc will operate on very low concentrations of IPE as maintenance. The PSRO membrane can be regenerated and maintained on less than 17.8 ppm of IPE with feed water containing 4 ppm of calcium. The exact dosage for each membrane was not established in this experiment, it was however demonstrated that the concentrations of IPE requied to protect the membranes are very low.

I claim:

1. An inorganic silicate polymer electret in a colloidal state with a zeta potential between about 33 and 50 mV, said inorganic polymer electret in a colloidal state is formed by prolonged flow through a counter current device, said flow generating a charge effect, which generates multiple bi-directional magnetic fields and an electrostatic charge on the adjacent moving charged colloid particles moving in the counter current flow, resulting in the inorganic silicate polymer electret in a colloidal state.

2. The inorganic polymer electret in a colloidal state of claim 1 wherein the zeta potential is between about 34 and 50 mV.

3. The inorganic polymer electret in a colloidal state of claim 1 wherein the zeta potential is between about 34 and 48 mV.

4. The inorganic polymer electret in a colloidal state of claim 1 wherein the zeta potential is between about 35 and 45 mV.

5. The inorganic polymer electret in a colloidal state of claim 1 wherein the zeta potential is between about 36 and 43 mV.

6. The inorganic polymeric electret in a colloidal state of claim 1 wherein the zeta potential is between about 37 and 41 mV.

7. The inorganic polymer electret in a colloidal state of claim 1 wherein the zeta potential is between about 37 and 39 mV.

8. The inorganic polymer electret in a colloidal state of claim 1 wherein the zeta potential is between about 37 and 38 mV.

9. The inorganic polymer electret in a colloidal state of claim 1 wherein the zeta potential is about 37.7 mV.

* * * * *